April 25, 1950     L. C. WEATHERS     2,505,018
ALTERNATING-CURRENT COMMUTATOR MACHINE
Filed Sept. 10, 1946     12 Sheets-Sheet 1

INVENTOR.
LELAND CLAY WEATHERS
BY Bacon & Thomas
attorneys

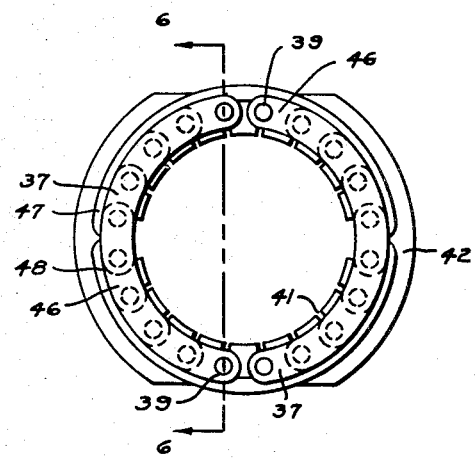
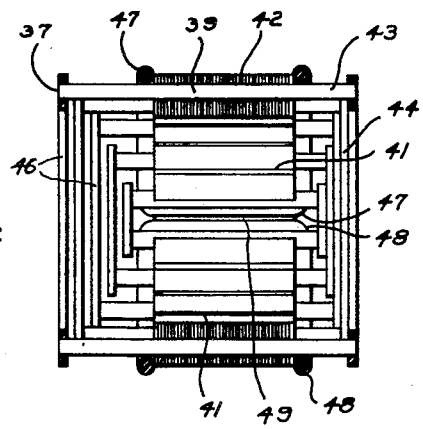
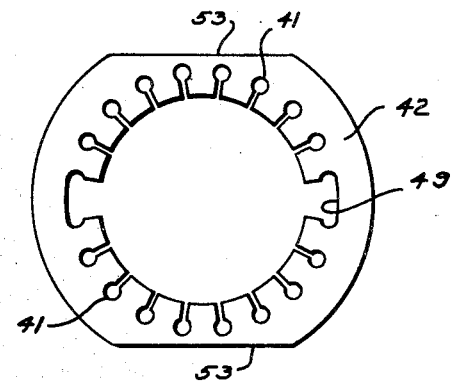

INVENTOR.
LELAND CLAY WEATHERS
BY Bacon & Thomas
Attorneys

April 25, 1950     L. C. WEATHERS     2,505,018
ALTERNATING-CURRENT COMMUTATOR MACHINE
Filed Sept. 10, 1946     12 Sheets-Sheet 7

INVENTOR.
LELAND CLAY WEATHERS
BY Bacon & Thomas
Attorneys

INVENTOR.
LELAND CLAY WEATHERS
BY Bacon & Thomas
Attorneys.

April 25, 1950  L. C. WEATHERS  2,505,018
ALTERNATING-CURRENT COMMUTATOR MACHINE
Filed Sept. 10, 1946  12 Sheets-Sheet 11

INVENTOR.
LELAND CLAY WEATHERS
BY Bacon & Thomas
Attorneys

Patented Apr. 25, 1950

2,505,018

UNITED STATES PATENT OFFICE 2,505,018

ALTERNATING-CURRENT COMMUTATOR MACHINE

Leland Clay Weathers, Detroit, Mich., assignor to Vickers Incorporated, Detroit, Mich., a corporation of Michigan Application September 10, 1946, Serial No. 696,006

23 Claims. (Cl. 318—244)

This invention relates primarily to power transmission and is more particularly concerned with an adjustable speed alternating current motor of the commutator type capable of operating over a wide range of speeds with improved speed regulation, power factor and commutation characteristics, the motor also being capable of operation as an asynchronous generator, although the invention also includes as subcombinations a commutation system of general application and a resonator transformer also capable of various other uses as well as a novel short circuited bar winding and a novel armature winding both capable of various applications.

The adjustable speed motor to which the present invention is particularly directed is essentially an alternating current shunt motor having operating characteristics which closely approach those of a direct current shunt motor. In other words, the speed of the motor may be adjusted by changing either the armature circuit applied voltage or the field circuit applied voltage and for any given adjustment the motor tends to run at constant speed, with only a slight decrease in speed as load is applied.

The two major problems in any alternating current motor of the shunt type are (1) the maintenance of the armature current in phase with the mutual or air gap flux produced by the field excitation so that all of the armature current is effective for producing torque, and (2) the elimination of commutation difficulties such as sparking or arcing between the brushes and commutator with resulting destruction of the brushes or commutator or both. These two problems are interrelated, as will appear in the following discussion.

The first of these problems is solved in accordance with the present invention by (a) resonating the armature circuit to maintain the armature power current in phase with the armature applied voltage, (b) preventing or overcoming any substantial reaction of the armature power current upon the field excitation circuit, (c) preventing or minimizing short circuit currents in the armature windings caused by brushes contacting more than one commutator bar in order to prevent substantial reaction of such currents upon the excitation circuit, and (d) establishing and maintaining a defining phase angle relation between the armature circuit applied voltage and the voltage applied across the field windings.

A resonator transformer having a capacitor connected in its secondary circuit is employed to effectively insert capacitive reactance into the armature circuit to neutralize the inductive reactance thereof and thus maintain the armature current in phase with the armature circuit applied voltage. To effectively employ such a resonator transformer, the inductive reactance of the armature circuit must remain substantially constant, since the capacitive reactance introduced by the resonator transformer is substantially constant throughout the normal operating range of the motor. The inductive reactance of the armature circuit is preferably maintained substantially constant by providing an improved commutation system and by providing low impedance stator windings which are short circuited in the power axis. Voltages induced in the short circuited winding by flux produced by the flow of power currents in the armature cause currents to flow which set up a magnetomotive force opposing the production of flux by the power currents in the armature. Substantially all of the flux in the motor iron is thus confined to the excitation axis. The inductive reactance of the armature, opposing flow of power current therethrough, is, therefore, of low and substantially constant value and similar to that of a short circuited transformer. With substantially constant inductive reactance in the armature circuit, the power current through the armature can be maintained in phase with the armature circuit applied voltage under widely varying speed and load conditions by introducing a constant value of capacitive reactance into the armature circuit.

Reactance from armature power currents will ordinarily disturb the phase relation between the field winding applied voltage and the mutual flux. As stated above, the stator windings, which are short circuited in the power axis, confine substantially all of the flux threading the armature to a definite direction in space, i. e., to the excitation axis of the motor. The armature power currents, whose resultant magnetomotive force is in the power axis, can, therefore, not produce any substantial amount of flux reacting upon the field circuit.

Short circuit currents in the armature windings due to short circuits through brush elements contacting more than one commutator bar also tend to disturb the phase relation between the mutual flux and the armature power currents. This is overcome by minimizing or preventing the flow of such short circuit currents as discussed below with respect to the commutation problem.

As there is no substantial reaction upon the excitation circuit by any type of current in the armature winding, the field current maintains a definite phase relation with the voltage applied across the field windings. This means that the mutual or air gap flux also maintains a definite phase relation with the voltage across the field windings. The armature power current is held in phase with the armature circuit applied voltage by the resonator transformer, as discussed above. By establishing a proper phase relation between the armature circuit applied voltage and the voltage across the field windings, the mutual flux can be brought exactly into time phase with the armature current so that all of the armature current is effective to produce torque. After the proper phase relation, just mentioned, has once been fixed by suitable circuit elements and connections, the armature power current remains in phase with the mutual flux under all conditions of speed and load within the operating range of the motor.

The commutation problem involves the overcoming or neutralization of varying armature reaction under varying loads, which armature reaction tends to rotate the mutual flux. Unless the mutual flux in the motor is confined to a given direction in space, i. e., to the excitation axis which is substantially perpendicular to the power axis, commutation conditions will vary under varying load, making effective commutation impossible. In the present motor, the mutual flux preferably is confined substantially entirely to the excitation axis by the employment of short circuited stator windings as above discussed. Since the flux in the iron of the motor can exist in only one axis, the effects of armature reaction which tends to rotate the mutual flux in the motor are substantially eliminated and one of the major factors causing poor commutation in alternating current motors is likewise eliminated.

In addition to commutation difficulties due to armature reaction, the problem of preventing large currents from flowing in the armature windings caused by armature coils being short circuited by the brushes during commutation is intensified over direct current machines. In alternating current machines of the type under discussion, the coils undergoing commutation have induced therein relatively large voltages due to transformer action from the field windings. These coils are directly in the excitation axis when being commutated and have maximum transformer voltage induced therein. A single brush element touching but one commutator bar at a time is not practicable and the use of brushes contacting more than one commutator bar will ordinarily cause large short circuit currents to flow. These large currents cause excessive heating of the contacting surfaces of the brushes and commutator and even more importantly, the breaking of the inductive short circuited armature coil circuits carrying large short circuit currents when the commutation of a coil is completed causes excessive sparking and arcing, resulting in rapid destruction of the commutator and brushes. Furthermore, these currents react upon the field excitation circuit to decrease the mutual flux, increase the power taken by the excitation circuit and disturb the proper phase relation between the mutual flux and the armature power current.

In accordance with the present invention, which can be understood most easily by reference to a typical shunt motor of the lap wound two pole type, a multiple brush element arrangement and a circuit for effectively electrically isolating the various brush elements is employed in conjunction with a dual winding upon the armature. The individual windings of the dual armature windings are connected to alternate commutation bars and are electrically independent except for being connected together through brush elements when individual brush elements span adjacent commutator bars. The width and spacing of the brush elements are correlated with the width and spacing of the commutator bars so that it is impossible to short circuit an armature coil directly through the brush elements. That is to say, any armature coil short circuit current must flow through the external connections to the brush elements. These external connections either balance out the major portions of the transformer voltages causing the short circuit currents or present paths of high impedance to flow of such currents or both. The result is to substantially prevent flow of armature coil short circuit current.

In addition to preventing armature winding short circuit currents the external connections to the brush elements must also provide for a proper distribution of the armature power current among the brush elements to enable the power currents in the two armature windings to be balanced in the two windings and also in the two halves of each winding in all commutator positions. If the power currents in the armature winding or halves of these windings are required to change materially between different positions of the commutator, the leakage reactance of the armature and increased losses in the armature iron, particularly at the high commutator frequency of high motor speeds, causes the armature to impose a high impedance to flow of armature power current and to convert a substantial portion of the energy supplied to the armature into heat. If the power currents through the armature windings are not required to change between different commutator positions, it is found that the power current through each brush element must change between different commutator positions. This requirement is to a considerable extent inconsistent with the requirement that the external connections to the brush elements also prevent short circuit currents, as the latter requirement involves restricting the variation of current between brush elements. In general, a compromise between the two requirements must be provided and the commutation circuits of the present invention are practical circuits which substantially prevent armature coil short circuit currents while at the same time providing for sufficient power current variation in the various brush elements to supply the armature winding power current demand for balanced currents therein at all times.

The number of coils in each armature winding is also of importance for several reasons. With an odd number of coils in each winding, the number of coils undergoing commutation in one winding is always the same as that in the other winding in any commutator position. Furthermore, the connections of the power circuit to one winding through the brush elements and commutator bars is always identical as to both windings in any commutator position. With an even number of coils the reverse is true as to both of the two preceding statements. An odd number of coils in each winding is therefore of assistance in maintaining balanced power currents in the two armature windings.

In addition, brush elements in the two brush structures connect the two windings together at points spaced nearly 180 electrical degrees apart. This provides armature winding short circuits for currents through the corresponding halves of the two armature windings. The employment of an odd number of coils in each armature winding, however, simplifies the commutation problem. Motors having an odd number of coils in each armature winding consistently have better commutation characteristics than those having an even number of coils, all other factors being the same. All of the disclosures of the present case, therefore, show armatures with two windings each having an odd number of coils, although it is to be understood that effective commutation can be secured with certain of the commutation systems shown herein even with an even number of coils in each armature winding.

As indicated above, the prevention of flow of large short circuit currents in the coils undergoing commutation as well as in the remainder of the armature windings is also an important factor in maintaining the mutual flux in phase with the armature power current. Both types of short circuit currents have their resultant magnetomotive forces in the excitation axis. The impedances of the circuits which allow each short circuit currents to flow are reflected into the excitation circuit. For example, if an armature coil undergoing commutation is completely short circuited, this coil becomes a short circuited transformer secondary winding having the excitation winding of the field circuit as a primary winding. The normally high impedance of the excitation winding drops to a low value, excessive current is taken by the excitation circuit and the mutual flux decreases and shifts its phase with respect to the excitation voltage. It is only by providing a substantially constant high impedance path for armature coil short circuit current or at least partly balancing out the voltages causing such currents, or both that the mutual flux can be maintained at all times in a definite phase relation with the excitation voltage and thus in phase with the armature current.

The circuits which substantially prevent flow of armature coil short circuit currents will, in general, either involve separate power transformer secondaries feeding certain of the brush elements or will contain one or more reactors having a plurality of coils which present low impedance to flow of armature power current but which present high impedance to flow of current between at least certain of the brush elements of a divided brush structure. Since the power armature current flows through such a reactor structure, the same iron core may in some cases be employed for both the reactor and the resonator transformer so that a portion or all of the means for prevention of armature coil short circuit currents may be combined with and form a part of the same apparatus which maintains the armature current in phase with the armature circuit applied voltage.

The factors above discussed enable the armature current to be maintained rigidly in phase with the mutual flux throughout the operating range of the motor so that all of the armature current for a given size motor and load is maintained at a minimum. Also, effective commutation is provided which is equal to or better than the commutation obtained on D. C. machines. Furthermore, reactance drops in the armature circuit are substantially eliminated and substantially the only factor causing a dropping speed load characteristic is the resistance of the armature circuit which may be made relatively low. The motor can be operated from either a single or polyphase source and is relatively simple in construction. Also, any of the motors described herein may be operated as generators and will inherently produce regenerative braking.

While the commutation system which prevents or minimizes the flow of armature coil or armature winding short circuit currents is an integral part of the alternating machines of the present invention, the principles of this system are capable of general application, for example, to improve commutation in D. C. machines, including the direct current portion of converters and dynamotors, and to prevent coil short circuits in adjustable autotransformers or reactors, tap changing transformers, etc., as will be later discussed in more detail. The commutator circuit per se is disclosed and claimed in my copending application Serial No. 139,457, filed January 19, 1950. The dual armature winding forming part of the commutation system, the coils of which each have two pitches, is believed to be novel per se and the same is true of the short circuited bar winding employed in certain modifications of the motor or generator to confine the mutual flux to the excitation axis. The multiple armature winding is disclosed and claimed in my copending application Serial No. 710,644, filed November 18, 1946, now Patent No. 2,490,181, granted December 6, 1949.

The resonator transformer discussed above also forms an integral part of the motor circuits of the present invention but is capable of being employed in other environments. In addition to inserting capacitive reactance it may be designed to give overload protection. In the present invention, the resonator transformer may be designed to cause the motors to take several times their normal full load current before dropping their loads but may alternatively be designed to give overload protection by limiting the armature current to a value not greatly above normal full load current even when the motor is stalled with full voltage applied thereto. The resonator transformer may also be employed to insert capacitive reactance into any power circuit and, if desired, to also limit the amount of current which can flow through such circuit with a given applied voltage. For example, it can be employed to improve the power factor of induction motors and, if desired, to also provide overload protection for such motors. The resonator transformer circuit for inserting series capacitive reactance in a power circuit is disclosed and claimed in my copending application Serial No. 41,113, filed July 28, 1948, and the overload protection circuit is disclosed and claimed in my copending application Serial No. 47,680, filed September 3, 1948.

It is an object of the invention to provide an alternating current adjustable speed motor having improved speed regulation.

Another object of the invention is to provide an adjustable speed alternating current motor of the commutator type in which commutation difficulties are eliminated and which can also be employed as an asynchronous generator.

Another object of the invention is to provide an adjustable speed alternating current motor of the shunt type in which the armature current is maintained in phase with the mutual flux of the motor under all conditions of load and speed within the capacity of the motor.

Another object of the invention is to provide an adjustable speed alternating current motor in which the armature current is maintained in phase with the armature circuit applied voltage.

Another object of the invention is to provide an alternating current adjustable speed motor of the commutator type in which rotation of the mutual flux in the motor iron due to armature reaction is substantially completely prevented.

Another object of the invention is to provide an alternating current motor in which short circuit currents due to short circuiting of armature coils by the brush structure during commutation are minimized.

Another object of the invention is to provide an adjustable speed alternating current motor which may be operated from either a single or polyphase source and in which the armature current remains in phase with the mutual flux and the armature circuit applied voltage and in which sparking or arcing at the commutator is substantially eliminated.

Another object of the invention is to provide an alternating current motor having a commutation circuit including divided brush structure and a dual armature winding substantially eliminating short circuit currents in armature coils undergoing commutation.

Another object of the invention is to provide an alternating current motor of the commutator type having dual armature windings in which the armature windings and brush structures are arranged to balance the power currents in the two windings while substantially preventing armature coil short circuit currents.

Another object of the invention is to provide an improved non-synchronous dynamoelectric machine having an armature circuit, a shunt exciting circuit and a commutation system in which short circuit currents in coils undergoing commutation are minimized or substantially prevented.

Another object of the invention is to provide an improved non-synchronous dynamoelectric machine having an armature circuit, a shunt exciting circuit and a device for inserting capacitive reactance into the armature circuit of said machine.

A further object of the invention is to provide an improved non-synchronous dynamoelectric machine having an armature circuit, a shunt exciting circuit and a transformer circuit for inserting capacitive reactance into the armature circuit and at the same time giving overload protection by limiting the amount of current in the armature circuit.

A still further object of the invention is to provide an improved non-synchronous dynamoelectric machine having an armature circuit, a shunt exciting circuit and a combination reactor and transformer circuit for inserting capacitive reactance into the armature circuit while at the same time opposing flow of short circuit current between brush elements of a multiple brush structure in series with the armature circuit.

Other objects and advantages of the invention will appear in the following description of the further embodiments shown in the attached drawings, of which:

Figure 3 is a fragmentary schematic diagram of a portion of a further modified motor circuit;

Figure 4 is a view similar to Figure 3 showing a portion of a still further modified motor circuit;

Figure 5 is a diagrammatic end elevation of a preferred stator structure of the motor;

Figure 6 is a vertical section taken on the line 6—6 of Figure 5;

Figure 7 is an end elevation of suitable stator laminations;

Figure 1:
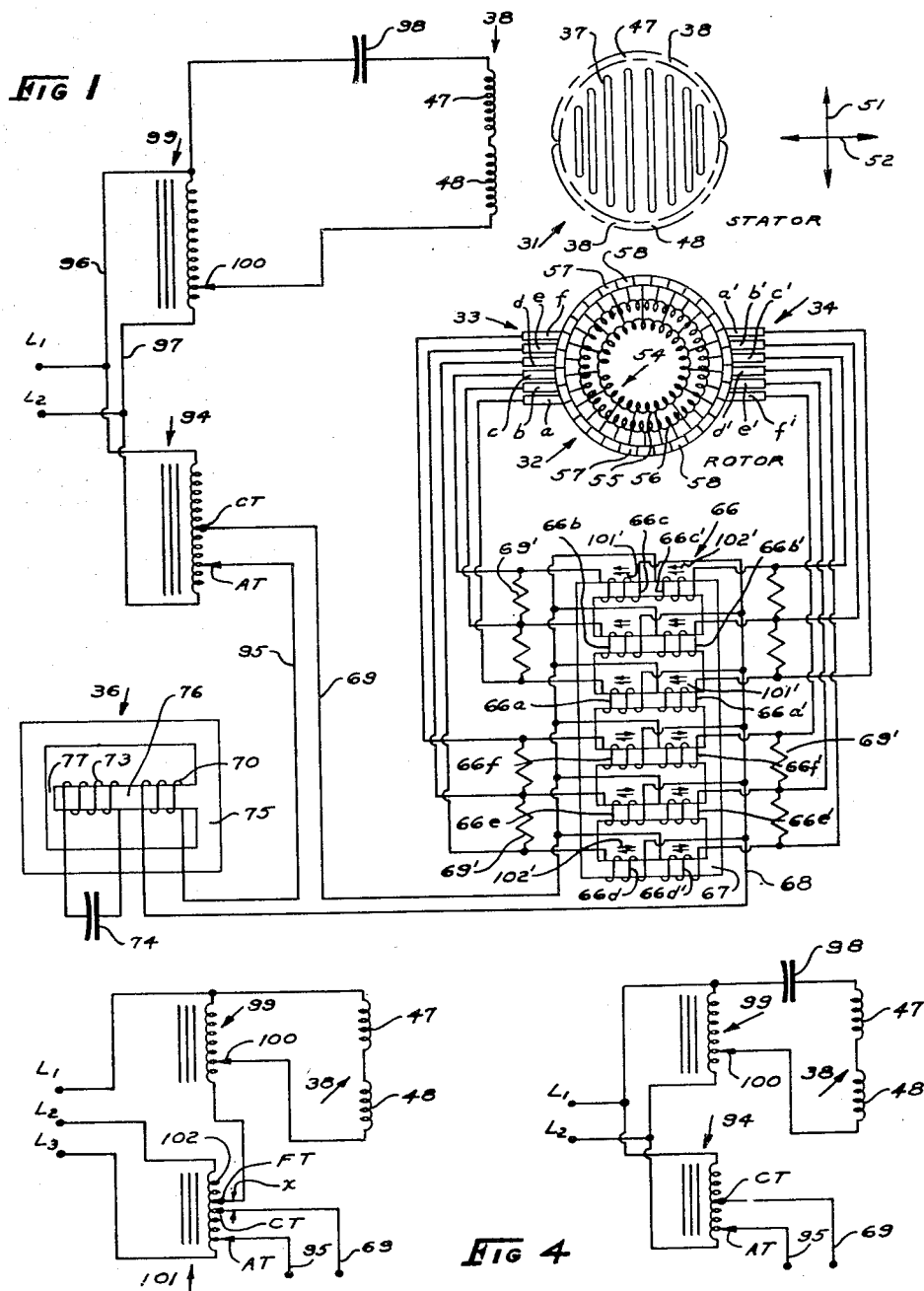
Figure 1 is a schematic diagram of a motor and motor circuit in accordance with the present invention.

Referring more particularly to the drawings, the motor and circuit of Figure 1 include a stator 31; a rotor or armature 32; multiple brush element structures 33 and 34 and a resonator transformer 36. The stator 31 of the motor includes a short circuited winding made up of elements 37 and an excitation winding 38. Figure 1 illustrates the electrical effect of the short circuited winding which is the same as if closed individual single turn loops of conducting material were positioned in slots in the stator iron so as to lie in parallel planes. The actual form of the elements 37 is, however, shown in Figures 5 and 6. These elements are ordinarily made of copper bars and have legs 39 extending through partially closed slots 41 in the stator laminations 42. The ends 43 of the legs 39 are all connected together by copper members 44 at one end of the stator. That is to say, the laminations of the member 44 are not insulated from each other. The connecting portions 46 between the legs 39 at the other end of the stator are arcuate so as to follow the curvature of the inner surface of the armature laminations as shown in Figure 5. The connecting elements 46 are spaced from each other so that these connecting elements and their associated pairs of legs 39 form U-bar elements 37. As stated above, the electrical effect of the winding is the same as if the U-bar elements 37 were individual closed loops and the latter type of winding could be employed. In either case, the result is a low impedance winding short circuited in one electrical axis of the machine.

The excitation windings of the motor are made up of two coils 47 and 48 (Figure 1). The actual position of these coils is indicated in dash-dot lines in Figure 1 and is shown in full lines in Figures 5 and 6. These windings are positioned in slots 49 of the stator iron, the slots 49 being shown most clearly in Figure 7. Energization of the windings 38 produces an alternating flux in the excitation axis of the motor the direction of which is indicated by the double-ended arrow 51 of Figure 1. The excitation axis is in quadrature to the power axis, the direction of which is indicated by the double-ended arrow 52. The excitation winding 38 may occupy a very small amount of space in the motor, as the motor may be made with a small air gap so that a small amount of excitation is required to bring the iron in the motor up to a flux density just below saturation. Also, the short circuited stator winding made up of the U-bars 37 prevents any substantial reaction of the power armature current upon the excitation circuit, as these currents tend to produce flux only in the power axis of the machine and no substantial amount of flux can exist in that axis. Furthermore, short circuit currents in the armature windings due to commutation conditions are substantially prevented or minimized as described in detail below. These currents react directly upon the excitation circuit as they tend to produce flux in the excitation axis. By minimizing short circuit currents in the armature windings and minimizing flux in the power axis, the field excitation becomes substantially independent of the armature circuit.

The motor of Figures 1 and 5 to 7 as well as the other motors described herein are illustrated as two pole motors but it is apparent that motors of any number of pairs of poles may be provided. For a two pole motor of the shunt type, the stator iron may have portions cut away adjacent the poles as indicated at 53 in Figure 7 to reduce the weight of iron employed and equivalent sections can be cut away adjacent each pole in a motor having more than two poles.

Figure 8:
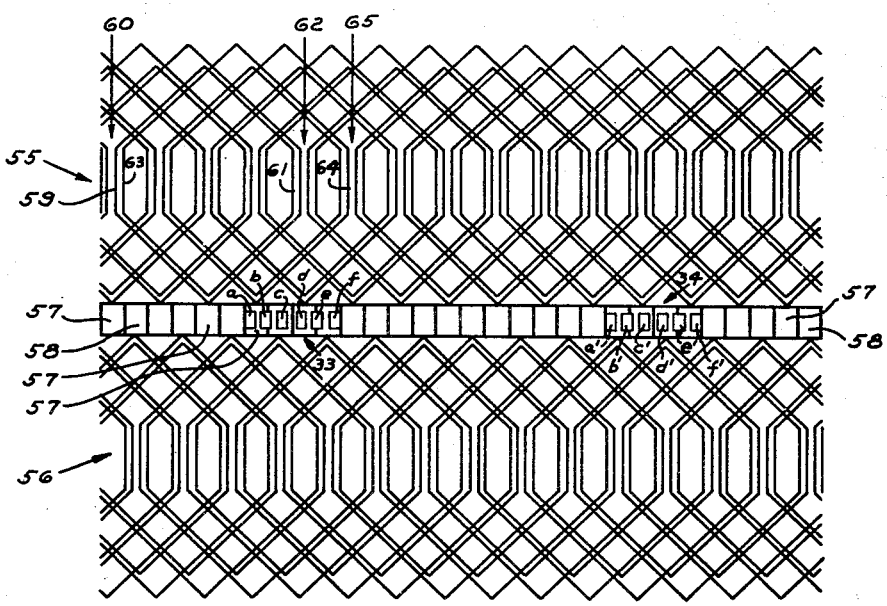
Figure 8 is a development of the dual winding employed on the armature of the motor.

The rotor or armature of the motor may have an iron structure which is substantially the same as that of a conventional D. C. motor except that iron lamination suitable for alternating currents are employed. The armature windings 54 in the slots of the armature iron are indicated diagrammatically in Figure 1 and include two separate closed windings 55 and 56 positioned in the same slots of the armature iron and connected to alternate commutator bars 57 and 58, respectively. An example of the actual winding which can be employed is developed in Figure 8. The commutator bars 57 and 58 are shown in the central portion of this figure. The winding 55 is illustrated at the top of the figure while the winding 56 is illustrated at the lower portion of the figure. It is to be understood, however, that both of these windings are on the same side of the commutator in the actual armature structure and occupy the same slots in the armature iron. The winding of Figure 8 is shown for a fifteen slot armature merely by way of example and there are twice as many commutator bars as slots making thirty commutator bars. In each winding 55 and 56 there are the same number of coils as there are armature slots but each coil is divided into two sections spanning a different number of slots in the armature. Thus, a coil of the winding 55 having its end connected to a commutator bar 57, has a portion 59 positioned in a slot indicated at 60, a second portion 61 positioned in a slot indicated at 62, a third portion 63 also positioned in the slot indicated at 60 and a fourth portion 64 positioned in a slot indicated at 65, the other end of the coil being connected to the next alternate commutator bar 57. The coil under discussion therefore has a portion spanning five slots and a portion spanning six slots. Each of the two portions of the coil has the same number of turns. The other coils of both windings are similarly arranged.

The reason for this winding is that the coils of one winding must advance electrically one half of the angular distance between armature slots with respect to the coils of the other winding. That is to say, the two windings are connected to alternate commutator bars and the angular distance between adjacent commutator bars is equal to one-half the angular distance between slots. The active conductors of the various coils, i. e., the slot conductors, are arranged in groups which are spaced an electrical angle from each other which is equal to 360 electrical degrees divided by the number of coils in each winding in the 360 electrical degrees but the electrical angle between the coils of one winding and the coils of the other winding is equal to 360 electrical degrees divided by the number of coils in all of the windings in the 360 electrical degrees, that is to say, the electrical angle between adjacent commutator bars.

The winding of Figure 8 results in entirely separate and distinct windings which are not connected to each other and which are electrically symmetrical with respect to the commutator bars to which they are connected. It will be apparent that brush elements making contact with adjacent commutator bars only cannot short circuit an armature coil under any condition of operation. While a fifteen slot armature having two pole dual windings and with coils having a split pitch of 5 and 6 slots has been illustrated, windings having any desired number of pairs of poles and any suitable pitch can be provided for armatures having any suitable number of slots.

As shown in Figure 1, brush structures 33 and 34 are respectively made up of a plurality of brush elements $a$, $b$, $c$, $d$, $e$ and $f$ and $a'$, $b'$, $c'$, $d'$, $e'$, and $f'$. The brush elements are electrically isolated from each other by employing a reactor 66. Each of the brush elements $a$ to $f$, inclusive, are connected to one terminal of corresponding separate reactor coils 66$a$, 66$b$, 66$c$, 66$d$, 66$e$ and 66$f$, each coil being positioned on one of the six separate legs of the core 67 of the reactor 66, the other terminals of the reactor coils being connected together by a conductor 68. Similarly, brush elements $a'$ to $f'$, inclusive, are connected to conductor 68 through corresponding separate reactor coils 66a', 66b', 66c', 66d', 66e' and 66f' also positioned on the legs of the reactor core 67 with coil 66a' on the same leg as coil 66a, coil 66b' on the same leg as coil 66b, etc. The control of the currents through the various brush elements by the reactor 66 as thus far described is, however, somewhat too rigid and shunt resistors 69' are connected between certain of the brush elements to reduce this control. This circuit substantially prevents flow of armature coil short circuit currents, as will be discussed in more detail below.

The resonator transformer 36 of Figure 1 has one terminal of its primary winding 70 connected to the conductor 68 so as to be in series with the armature circuit and is employed to maintain the armature power current in phase with the armature circuit applied voltage under all conditions within the normal operating range of the motor. The resonator transformer 36 also includes a secondary winding 73 connected across the terminals of a condenser 74. The resonator transformer 36 is a step-up transformer, i. e., the primary winding 70 has a much smaller number of turns than the secondary winding 73. With this arrangement the condenser 74 may have a relatively small capacity and be relatively small in size because of the smaller current flowing therethrough while at the same time effectively neutralizing the inductive reactance in the armature circuit. The preferred form of the core 75 of the resonator transformer is also indicated in Figure 1. The windings 70 and 73 are both positioned upon the central leg 76 of the core 75 and an air gap 77 is provided so that the mutual flux traverses this air gap. The air gap 77 has appreciable length so that the reluctance of the core remains substantially constant over a wide range of currents flowing in the primary 70.

Figure 9:
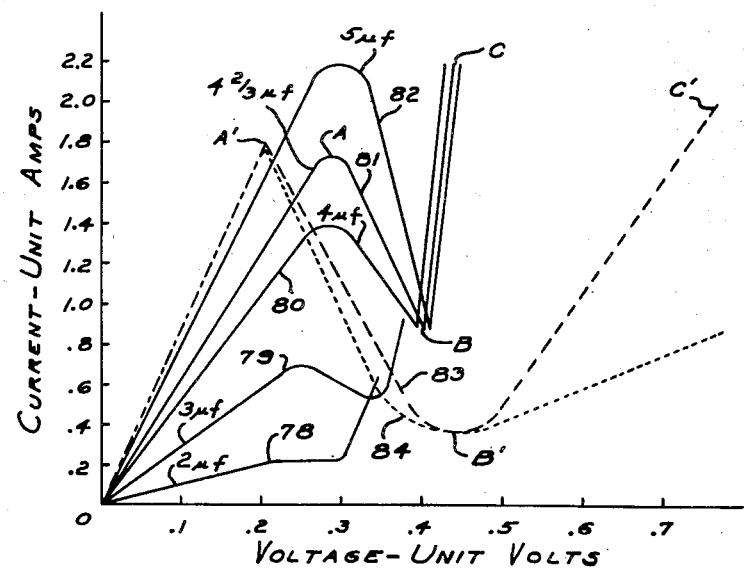
Figure 9 is a graph showing the operative characteristics of the resonator transformer and of the complete armature circuit.

The voltage current characteristics of the resonator transformer circuit as well as the characteristics of the complete armature circuit are shown by the curves of Figure 9. In this figure, current in unit amperes is plotted against the voltage in unit volts so that the values are applicable to resonator transformers of any size. For purposes of this specification, unit amperes will be defined as the actual amperes flowing through the primary winding 70 divided by the rated or normal full load current of the circuit. In the present case the normal full load current of the circuit is the normal full load armature current of the motor, which may be defined as that current which the armature can carry without overheating of the motor under continuous operation. Unit volts may be defined as the actual voltage across a selected component of the circuit divided by the rated voltage of the circuit. In this case the rated voltage of the circuit is the rated voltage of the motor which is determined primarily from the speed desired when the motor is fully excited and by the insulation characteristics of the motor armature.

In Figure 9 the curves 78 to 82, inclusive, show the effect of employing condensers having different capacities with a given resonator transformer. These curves show unit current through the primary winding 70 plotted against unit volts across the primary winding 70. All of the curves have a substantially straight line portion extending from the origin. In this operating range the current is substantially directly proportional to the voltage. These straight line portions thus show that the series impedance of the primary of the resonator transformer with a given condenser is substantially constant over a considerable range of currents and voltages. The slope of straight line portions of the curves increases with the value of capacitance of the condenser 74 connected across the secondary, i. e. the impedance decreases. As the voltage is increased, the curves pass through a maximum current point, for example the point A on curve 81, and begin to bend a short distance before this maximum is reached. For the higher values of capacitance the maximum current is reached in the neighborhood of a flux density of 89 thousand lines per square inch for standard transformer silicon sheet steel. As the voltage, i. e. the flux density, continues to increase, the series impedance of the primary increases. A maximum impedance, i. e. a minimum current point, is reached when the saturation of the iron is in the neighborhood of 115 thousand lines per square inch, for example, at the point B on curve 81. As the saturation of the iron is further increased, i. e. the voltage across the primary 70 is increased, the impedance rapidly decreases, as shown by the nearly vertical portion of the curve 81 between the points B and C. The flux density of the iron at point C on curve 81 was approximately 123 thousand lines per square inch.

For a particular motor circuit and resonator transformer, it was found that a value of capacitance of 4⅔ microfarads gave just sufficient capacitive reactance on the straight portion of the curve to neutralize the inductive reactance of the armature circuit. That is to say, a resonator transformer operating on the curve 81 was employed. Curve 83 was plotted using unit amperes through the armature circuit against unit volts across the entire armature circuit. Curve 84 shows the component of the armature current in unit amperes which was in phase with the armature applied voltage plotted against unit volts across the entire armature circuit. It will be noted that the in phase component of the current shown by curve 84 represented the total current along the straight line portion of the curves 83 and 84, i. e. until the maximum current at the point A' was substantially reached.

Figure 10:
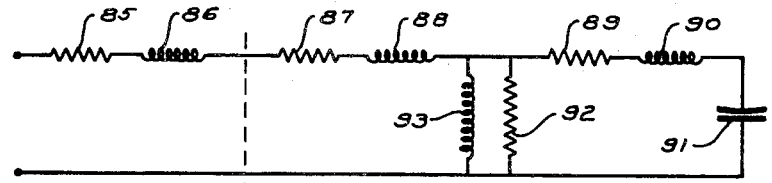
Figure 10 is an equivalent diagram of the armature circuit.

The equivalent circuit of the armature circuit is shown in Figure 10. In this figure the resistance 85 and inductance 86 represent the total resistance and inductance respectively of the armature circuit exclusive of the resonator transformer. The resistance 87 and inductance 88 represent the actual resistance and inductance respectively of the primary winding 70 of the resonator transformer, the inductance 88 being due to primary leakage flux. The resistance 89 and inductance 90 represent the actual resistance and inductance respectively of the secondary circuit of the resonator transformer, the inductance being due to secondary leakage flux. The capacity 91 represents the capacity of the condenser 74. The resistance 92 represents the effective resistance due to eddy current and hysteresis losses in the core and the inductance 93 represents the inductance due to the mutual flux. That is to say, the inductance 93 and resistance 92 constitute an impedance in parallel with the secondary which passes the magnetizing current for the core. All of the values of the elements 89 to 93, inclusive, are conventionally referred to the primary.

For low values of flux density, all of the above factors remain substantially constant as shown by the straight portions of the curves 78 to 82 as well as curve 83 near the origin. The capacitive reactance of the capacity 91 is greater than the inductive reactance of the inductance 90 so that the portion of the circuit containing these impedances has a relatively large net capacitive reactance. This net capacitive reactance is less than the inductive reactance of the inductance 93 and the resistance 89 is also much lower than the resistance 92. The parallel circuit including the elements 89 to 93, therefore, has a resulting capacitive reactance. This resulting capacitive reactance is greater than the inductive reactance of the inductance 88 so that the resonator transformer has an effective capacitive reactance and along the straight portion of the curves 78 to 82 the current through the primary 70 leads the voltage across the primary. The effective capacitive reactance of the resonator transformer is made equal to the inductive reactance of the inductance 86 representing the remaining inductance in the armature circuit so that the total impedance of the armature circuit is resistive and the armature power current is in phase with the armature circuit applied voltage along the straight portion of the curves 83 and 84 between the origin and the point A'.

The value of the inductance 93 is directly proportional to the permeability of the iron core and the permeability of the core decreases when the iron begins to saturate. The air gap 77, however, has constant permeability and the length of the straight portion of the curve for a given size condenser can be increased by increasing the length of the air gap while at the same time increasing the cross section of the iron. When the iron does begin to saturate, the major effect is to cause the permeability of the core to decrease, to in turn decrease the value of the inductance 93. Analysis of the equivalent circuit shows that the effective capacitive reactance of the resonator transformer first increases rapidly as the point A' on the curve 83 is passed so that the armature current shown by the curve 83 decreases and leads the armature applied voltage. Thus the in phase component of the armature current shown by the curve 84 departs from the total armature curve 83. The point A' occurs at a flux density of approximately 89 thousand lines per square inch and as saturation of the iron continues to increase, the circuit including the resistance 89, inductance 90, capacity 91 and inductance 93 approaches a condition of parallel resonance so that its impedance continues to increase but approaches a pure resistance. The net capacitive reactance reflected into the primary decreases again to that which just balances the inductive reactance of the rest of the armature circuit, which condition occurs at the point B' on both curves 83 and 84 at a flux density of approximately 115 thousand lines per square inch. The armature power current is again in phase with the armature circuit applied voltage. As saturation of the iron is further increased, the total impedance of the armature circuit becomes inductive and decreases so that the armature power current increases and lags the armature circuit applied voltage. The point C' was reached on curve 83 at a flux density of approximately 123 thousand lines per square inch.

The normal operating range of the motor circuit is along the straight portion of the curve 83 adjacent the origin. Thus the armature current remains in phase with the armature circuit applied voltage from zero current to nearly two times normal full load current. By varying the size of the iron core of the resonator transformer, the number of turns in the windings thereon and the length of the air gap, the maximum current point A' can be caused to occur at substantially any desired point within wide limits. Thus the armature current may be maintained in phase with the armature circuit applied voltage up to armature currents several times the rated armature current.

It will be noted that the point A' occurred in the neighborhood of two-tenths of the armature circuit rated voltage. The reason for this is that the data for the 83 and 84 curves were taken with no excitation on the motor so that the armature back voltage or "speed voltage" was not present. The voltages plotted in Figure 9 with respect to curves 83 and 84 are therefore the voltages required to overcome impedance in the armature circuit and the remainder of the applied voltage in each case would be that required to balance the armature back voltage, i. e. the voltages induced in the armature coils due to movement of the coil conductors through the mutual flux.

The phenomena of decreasing current with increasing voltage across the armature circuit represented by the portion of curve 83 between the points A' and B' may be employed as overload protection for the motor. In other words, if the motor is overloaded so that the speed and thus the speed voltage decreases, the voltage overcoming the impedance of the armature circuit will increase and after the point A' is reached the current through the armature circuit will decrease as further load is placed on the motor. After the point B' has been passed as the motor further slows down, the current will again increase but, as shown by the curve 83 for the particular resonator transformer and motor selected, the current does not again reach rated value until approximately six-tenths of the armature circuit applied voltage is utilized for overcoming the impedance of the armature circuit. That is to say, the current through the armature circuit does not again reach normal full load current until the speed voltage of the armature has decreased to a very small value and it is possible to design a resonator transformer for a particular motor which will enable the motor to be stalled without the current substantially exceeding the normal full load current. From the above discussion, it should be clear that a resonator transformer can be constructed so that a particular motor will carry its full rated load but which will stall when slightly overloaded without substantially exceeding normal full load current, or, on the contrary, the resonator transformer can be designed so that the armature current can rise to several times rated current before the motor drops its load.

As an aid in constructing a resonator transformer for a given motor, the following suggested design procedure is given. The required information is (1) the motor armature circuit inductive reactance, (2) the voltage required at the point B', (3) the maximum current required at the point A', and (4) the maximum continuous operating voltage of the condenser 74.

The flux density at the point B' will always be about 115,000 lines per square inch for standard transformer silicon sheet steel. Assuming an air gap length and using a flux density of 115,000 lines per square inch and the required voltage at the point B', the cross sectional area of the core and the primary turns can be calculated by standard transformer design procedure. Using the flux density at the point B' and the maximum working voltage of the capacitors available, the number of secondary turns can be calculated. The turn ratio is thus determined and the capacity of the condenser can then be calculated so as to neutralize the armature circuit inductive reactance along the straight portion of the curve.

Knowing that the point A' will occur at a flux density of approximately 89,000 lines per square inch, this point A' can be located. It is unlikely that the desired value of current at the point A' will be obtained in the first calculation, but the larger the air gap the nearer the voltage at point A' approaches the value of the voltage at point B'. By a relatively few numbers of repeated calculations assuming different lengths of air gaps, the desired point A' may be approximated for any desired point B'. The resonator transformer may thus be designed for either overload protection or for a motor which can be tremendously overloaded without dropping its load. Curve 83 of Figure 9 represents a compromise between these two extremes. While the resonator transformer is an essential part of the motor circuits of the present invention, it should be apparent that it can be employed for many other purposes, for example, for improving the power factor of alternating current machines or circuits taking lagging currents or as overload protection for alternating current machines ordinarily having a resultant inductive reactance. For example, the resonator transformer can be employed for overload protection of induction motors or for improving the power factor of the motor circuit or for both purposes. If sufficient inductive reactance is not normally present in a power circuit to enable the resonator transformer to provide overload protection, a reactor can be employed in the circuit and its inductive reactance balanced by the resonator transformer.

Referring again to Figure 1, this figure shows a circuit for supplying a motor from a single phase source indicated by the alternating current lines L1 and L2. The armature may be supplied through an adjustable auto-transformer 94 having its terminals connected across the lines L1 and L2 and provided with a center tap CT and an adjustable tap AT. The conductor 69 may be connected to one of these taps, for example, the center tap CT and the other tap, for example, the adjustable tap AT, may be connected by a conductor 95 to the conductor 68 through the primary 70 of the resonator transformer. The excitation windings 38 are also connected to the lines L1 and L2 by the conductors 96 and 97 respectively. A condenser 98 is connected in series with the excitation windings 38 to cause the excitation circuit to take leading current and establish a proper phase relationship between the voltage actually impressed across the windings 38 and the armature circuit applied voltage in order to bring the armature current into phase with the mutual flux as explained in more detail below. An auto-transformer 99 having an adjustable tap 100 may be connected across the conductors 96 and 97 to provide for adjusting the excitation voltage. By moving the adjustable tap 100 and the adjustable tap AT to their lowermost positions in Fig. 1, the motor will have full design voltage applied to all of its windings and will run at its normal speed with only a small decrease in speed as load is applied. The adjusted speed of the motor may be decreased from its normal speed by adjustment of the tap AT of the autotransformer 94 towards the center tap CT to lower the armature circuit applied voltage and under these conditions the motor operates as a "constant torque" motor, i. e., the maximum torque which the motor can produce without overheating remains substantially constant with different speed adjustments. The motor will be brought to a stop when the adjustable tap AT is at the same position as the center tap CT and can be reversed and its speed increased up to normal speed in the reverse direction by further movement of the tap AT upwardly in Fig. 1. On the other hand, the speed of the motor may be increased above the normal speed by moving the tap 100 on the auto-transforrmer 99 to lower the excitation circuit applied voltage. Under these conditions the motor operates as a "constant horsepower" motor as the maximum power which the motor can produce without overheating remains substantially constant. Either or both types of speed adjustment can be employed, depending upon the speed range desired, and if both are employed the speed range will extend from substantially zero speed up to any speed short of mechanical failure of the motor. If the high or constant horsepower range is not desired, the auto-transformer 99 can be omitted and if the low or constant torque range is not desired, the auto-transformer 94 can be omitted. In the latter case, the armature windings may be designed for full line voltage and reversing accomplished by a conventional reversing switch.

Figure 2:
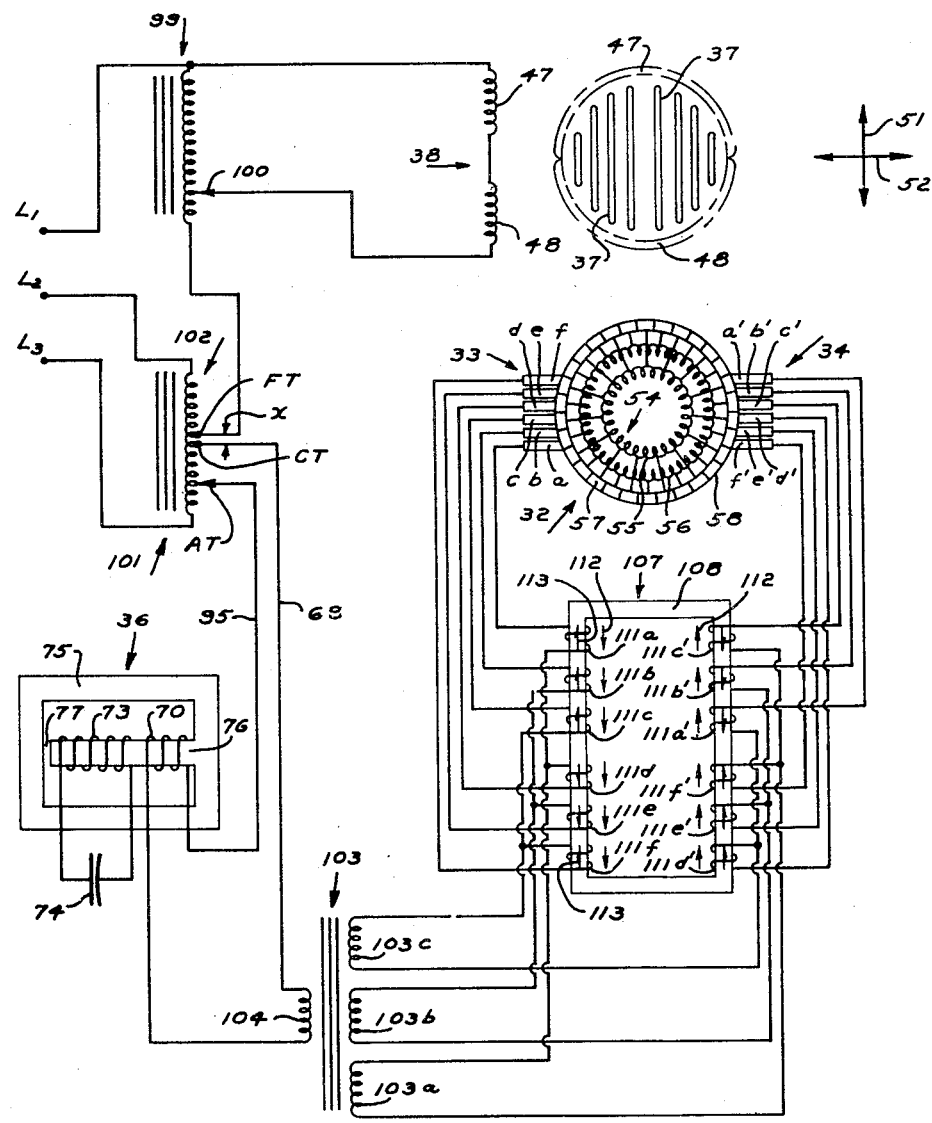
Figure 2 is a diagram similar to Figure 1 showing a modified motor circuit.

Figure 2 shows a motor of the same type illustrated in Figure 1 arranged for three-phase operation and having a modified commutation circuit. Where the elements are the same and perform the same function, they have been given the same reference numerals employed in Figure 1 and certain of these elements will not be further referred to. The same procedure will be followed throughout the specification.

In Figure 2, instead of employing a condenser 98 (Figure 1) in the excitation circuit, an autotransformer 101 is connected across the lines L2 and L3 of a three-phase source and the excitation circuit including the excitation windings 38 and the auto-transformer 99 is connected between the line L1 and a fixed tap FT on the winding 102 of the auto-transformer 101. The fixed tap FT on the winding 102 is displaced from the center tap CT of this winding by a distance designated by $x$ in Figure 2. The armature circuit of the motor is supplied through conductors 69 and 95 connected between the center tap CT and an adjustable tap AT on the winding 102 of the autotransformer 101. The modified commutation circuit of Figure 2 will be described in detail later, it being sufficient to state at present that this system effectively electrically isolates the brush elements $a$ to $f$, inclusive, of the brush structure 33 and also effectively electrically isolates the brush elements $a'$ to $f'$ of the brush structure 34 while at the same time resonating the armature circuit to maintain the armature current in phase with the armature circuit applied voltage. Speed adjustment within the constant torque range may be accomplished by moving the adjustable tap AT on the autotransformer winding 102. Carrying this tap to a position corresponding to the center tap CT will stop the motor and continuing movement of the tap AT past the center tap CT will cause the motor to reverse and increase its speed in the opposite direction. As described with reference to Figure 1, movement of the adjustable tap 100 on the autotransformer 99 will adjust the speed in the constant horsepower range and either or both of these ways of speed adjustment may be employed. In either case, the motor will act as a generator to produce regenerative braking if the inertia of the load tends to drive the motor when the speed setting is changed to reduce the speed or stop the motor.

Figure 11:
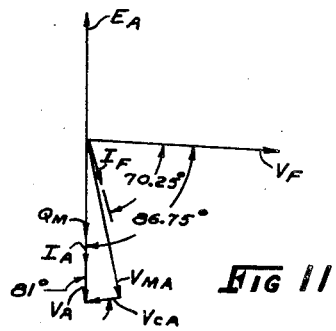
Figure 11 is a simplified vector diagram of the motor circuit for one direction of rotation.

To aid in understanding the operation of the motor of Figure 2, reference is made to the vector diagram of Figure 11. In this diagram the vector $V_A$ is the armature circuit applied voltage. Since the armature circuit is in series resonance, the armature current denoted by the vector $I_A$ is in phase with the armature circuit applied voltage. The mutual flux $Q_M$ should also be in phase with the armature current and this can be accomplished by maintaining a definite phase relationship between the field applied voltage $V_F$ and the armature circuit applied voltage $V_A$. The field current $I_F$ will lag the field applied voltage $V_F$ since the field winding is inductive and the mutual flux $Q_M$ will lag the field current $I_F$ because of hysteresis and eddy current losses in the iron. Since the power currents in the armature circuit cannot affect the field excitation, as no substantial flux can be set up in the power axis of the motor, the phase angle between the mutual flux and the field applied voltage remains constant and the same is true of the phase angle between the field applied voltage and the field current. In a particular motor, these angles were 86.75 degrees and 70.25 degrees respectively. By maintaining a fixed phase angle between the field applied voltage and the armature circuit applied voltage, i. e., 86.75 degrees in the particular motor of the vector diagram of Figure 11, the mutual flux is maintained in phase with the armature circuit current at all times.

Figure 14:
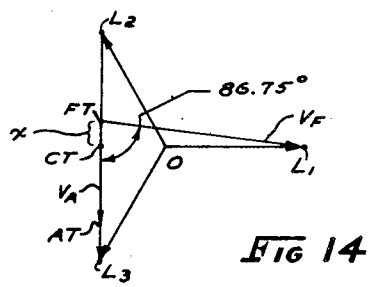
Figure 14 is a vector diagram illustrating one manner of obtaining from a three-phase circuit the required angularity between the field excitation voltage and the armature circuit voltage in a polyphase circuit.

Figure 14 shows one manner of maintaining the desired phase angle between the field applied voltage and the armature circuit applied voltage. In the vector diagram of Figure 14, $L_1$, $L_2$ and $L_3$ are the three-phase voltage vectors of the three-phase source of Figure 2, these vectors having phase angles with each other of 120 degrees. Since the autotransformer 101 of Figure 2 has its winding 102 connected between lines $L_2$ and $L_3$, the vector connecting the points $L_2$ and $L_3$ of Figure 14 represents the voltage across the winding 102. The armature circuit applied voltage is represented by the vector $V_A$ between the points CT and AT. By connecting the field excitation circuit between the line $L_1$ and a fixed tap represented by FT spaced from the center tap represented by CT a distance $x$ as shown in Figure 14, the field applied voltage is represented by the vector $V_F$ extending between the point FT and the point $L_1$. By predetermining and fixing the distance $x$, the correct angularity between the vector $V_F$ and the vector $V_A$ for any given motor may be readily obtained, for example, in this case an angle of 86.75 degrees.

Referring again to the vector diagram of Figure 11, the actual voltage across the motor armature is indicated by the vector $V_{MA}$ and the actual voltage across the primary 70 of the resonator transformer employed is represented by the vector $V_{CA}$. Since the vector $V_{MA}$ includes the voltage necessary to overcome the speed $E_A$ as well as the resistance and leakage reactance through the armature, it is of considerably greater magnitude than the voltage $V_{CA}$. Since the mutual flux is in phase with armature circuit current and the armature circuit applied voltage, the speed voltage $E_A$ is in phase opposition to the armature circuit applied voltage $V_A$ and differs in value therefrom only by the resistance drop in the armature circuit. This means that the speed regulation of the motor for any given speed adjustment is excellent and approaches that of a D. C. shunt motor since reactance drops in the armature circuit are entirely eliminated throughout the normal operating range of the motor.

Figure 12:
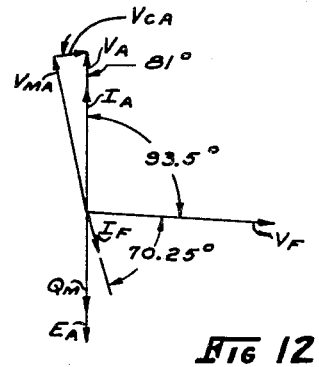
Figure 12 is a vector diagram illustrating the other direction of rotation of the motor.

Figure 12 is a vector diagram entirely similar to Figure 11 except that it illustrates reverse rotation of the motor by carrying the adjustable armature tap AT on the autotransformer 101 of Figure 2 past the center tap CT. The armature circuit applied voltage $V_A$ is reversed in direction and the same is true of the armature current $I_A$. This reverses the direction of the armature voltage $V_{MA}$ as well as the voltage $V_{CA}$ across the resonator transformer. The directions and magnitudes of the field applied voltage $V_F$, the field current $I_F$ and the mutual flux $Q_M$ remain the same but the speed voltage $E_A$ is reversed in direction because of reversed rotation of the motor armature. In a particular motor the angle between the mutual flux $Q_M$ and the armature current $I_A$, taking into consideration that the armature current is in phase opposition to the mutual flux in one direction of rotation of the motor, varied only a fraction of a degree upon reversal of the motor.

Figure 13:
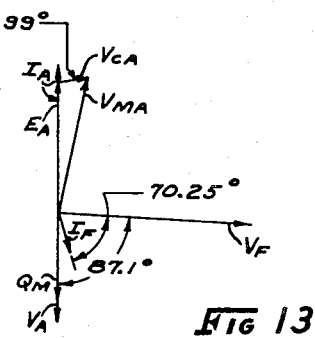
Figure 13 is a vector diagram illustrating operation of the motor as a generator.

Any of the motors of the present invention will operate as generators and Figure 13 illustrates such operation, mechanical power being applied to the shaft of the motor and electrical power being taken from the armature circuit. The vector diagram of Figure 13 is very similar to that of Figure 11 except that the armature current is reversed and the actual voltage across the armature $V_{MA}$ lags the armature current instead of leading as in Figure 11. The armature current, however, remains substantially in phase with the armature circuit output voltage $V_A$ and with the speed voltage or generated voltage $E_A$. In this case, the armature voltage output $V_A$ is less than the speed voltage $E_A$ by the resistance drop in the armature circuit. The mutual flux $Q_M$ maintains very closely the same angular relationship with the field applied voltage $V_F$, the change in angularity being less than one-half degree. It will be appreciated that the machines of the present invention operating as generators must be connected to a frequency setting source such as an alternating current line or some other means must be employed to fix the frequency of the generator, the excitation for the machine being derived from such line or means.

Figure 15:
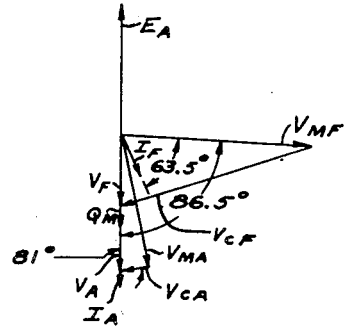
Figure 15 is a vector diagram illustrating single phase operation of the motor.

Figure 15 is a simplified vector diagram illustrating the operation of the motor of Figure 1, i. e. from a single phase source. The field circuit applied voltage $V_F$ is in phase with the armature circuit applied voltage $V_A$. By connecting the condenser 98 in series in the field excitation circuit, the field current $I_F$ can be made to lead the field applied voltage $V_F$ and, as is the case in the vector diagrams of Figures 11 to 13, the actual voltage across the field winding leads the field current. The actual voltage across the field winding is indicated by the vector $V_{MF}$ in Figure 15 and in a particular motor led the field current by an angle of 63.5 degrees. The actual voltage across the field windings had a phase angle displacement from the field applied voltage $V_F$ of 86.5 degrees and the same phase angle displacement with respect to the armature current $I_A$ and armature circuit applied voltage $V_A$. This angle of 86.5 degrees also caused the mutual flux $Q_M$ to be in phase with the armature current $I_A$, and this angle remained constant throughout the normal operating range of the motor. Otherwise, the vector diagram of Figure 15 is entirely similar to the vector diagram of Figure 11.

It will be apparent from the vector diagram of Figure 15 that the single phase motor of Figure 1 actually takes a slightly leading current as the armature current is in phase with the armature applied voltage and the field current leads the field circuit applied voltage. The voltage across the field windings 38 is substantially higher than the field circuit applied voltage due to flow of leading current through the inductive field winding and the motor field windings can either be wound for a higher field voltage or the field circuit applied voltage can be lowered for any given motor.

The above discussed phase relationships will, however, not be maintained unless a commutation system is provided which will prevent or at least drastically limit the magnitude of short circuit currents in the armature windings caused by brush elements simultaneously contacting more than one commutator bar. With a single brush element in each brush structure and a single armature winding, the brush element must be wide enough to span several commutator bars if adequate contact area between the brush elements and the commutator is provided. This means that several armature coils are short circuited by the brush elements when undergoing commutation. Even a multiple or divided brush structure having a plurality of brush elements does not avoid this short circuiting when a single armature winding is employed. The short circuited coils are directly in the excitation axis and have substantial transformer voltages induced therein by the mutual flux. Large short circuit currents will flow through such coils and the brush elements and will react on the excitation circuit to disturb the phase relationship between the armature winding applied voltage and the mutual flux. Furthermore, breaking of the inductive coil circuits containing the large short circuit currents as commutation of armature coils is completed, causes excessive sparking and arcing at the commutator surface, rapidly destroying the commutator and brushes. The employment of high resistance brushes having sufficiently high contact resistance with the commutator to substantially prevent such short circuit currents is not practicable, as sufficiently high resistance to effectively prevent short circuit currents also results in high resistance to the flow of armature power currents causing excessive heating at the surface of the commutator and poor speed regulation of the motor.

By employing brush structures having a plurality of brush elements of sufficient number and of proper width and spacing in connection with dual armature windings connected to alternate commutator bars also of proper width and spacing and with a proper brush element isolating circuit, armature coil short circuit currents can be substantially eliminated without substantially interfering with the distribution of armature power current to the armature windings.

With dual windings on the armature such as shown in Figures 1 and 8 connected to alternate commutator bars, armature coils undergoing commutation cannot be short circuited directly through the brush elements if the width and spacing of the brush elements are correctly correlated with the width and spacing of the commutator bars. For a dual armature winding, a single brush element must not have a width which is greater than the distance between centers of adjacent commutator bars plus the distance between commutator bars. Such a single brush element does not provide adequate contact area, and power current is not correctly distributed to the two armature windings. Also, for two brush elements, the width of the two brush elements plus the distance between these brush elements must also not be greater than the distance between centers of adjacent commutator bars plus the distance between commutator bars. A two brush element arrangement is therefore not as effective as a single brush element. With a three brush element arrangement, the thickness of a brush element plus twice the distance between brushes must not be less than the distance between centers of adjacent commutator bars minus the distance between commutator bars and any two of the brush elements must conform to the above relations for two brush elements. When both of these latter relations are taken into consideration, it is found that more than two brush elements can be employed without directly short circuiting an armature coil of the dual winding and that three brush elements should approximately span two commutator bars.

A dual winding on an armature having an odd number of coils in each winding in conjunction with six brush elements spanning a total of four commutator bars produces a practical arrangement wherein adequate contact area is provided, and if the relations between the width and spacing of the brush elements are correlated with the width and spacing of the commutator bars as above discussed, all short circuit currents in the coils undergoing commutation must flow through the external connections to the brush elements. More than six brush elements in each brush structure can be successfully employed but this has the disadvantage that an increase in the number of brush elements leads to complications of the commutation circuit for preventing coil short circuit currents in addition to complicating the brush structures.

Since brush elements of the brush structure 33 will connect the two armature windings 55 and 56 together in certain positions of the commutator, for example the brush elements $e$ of Fig. 1, and the same is true of the brush elements of brush structure 34, for example the brush element $b'$, circuits for armature winding short circuit currents through the two windings and through the interconnecting brush elements are provided in certain positions of the commutator. That is to say, unless the transformer voltages in the short circuits are balanced between the interconnecting brush elements of the two brush structures, resulting transformer voltages tend to cause the armature winding short circuit currents just mentioned. With an odd number of coils per pair of poles in each armature winding, the transformer voltages in the short circuits are balanced. With an even number of coils per pair of poles in each armature winding, resulting transformer voltages in the short circuits between the brush structures are produced. Any short circuit currents in these circuits do not flow through the external connections to the brushes but do flow through the interconnecting brush elements and the contact area between such brush elements and the commutator bars. An odd number of coils per pair of poles in the armature windings employed in conjunction with at least six brush elements in each brush structure is therefore the preferred motor structure. If more than six brush elements in each brush structure are employed, best results are obtained if a multiple of three brush elements is employed.

The commutation problem is also complicated by the fact that the power current through each brush element must vary between different commutator positions if the current through the two armature windings and through the two halves of each winding are balanced and not required to vary between different commutator positions. In general, it is necessary to maintain such a balance of currents in the armature windings, particularly at high speeds. In fact, the leakage reactance of the armature windings imposes a very high impedance to the flow of armature power current through the armature windings at high armature speeds if the currents in the armature windings are required to vary at commutator ripple frequency by the nature of the external commutation circuit employed. Also, the losses in the armature iron become excessive. The power current demand of the armature windings for balanced currents therein must therefore be satisfied by permitting the current through each brush element to vary. The problem is to prevent the flow of the current through the various brush elements due to armature coil short circuit currents while permitting variation of current through the various brush elements in order to satisfy the power current demand of the armature windings.

There are six possible commutator positions with the dual armature windings of the present invention and the six brush elements of the brush structures 33 and 34 spanning a total of four commutator bars. These six commutator positions are illustrated in sequence in Figures 16 to 21, inclusive, for an odd number of armature coils in each winding. All of the armature coils except those actually undergoing commutation are omitted, the omitted portions of the windings 55 and 56 being indicated by the dotted lines. In these figures the commutator bars contacting the brush elements of the brush structure 33 progress upwardly and the commutator bars contacting the brush elements of brush structure 34 progress downwardly. After the position of Fig. 21, the commutator returns to the position of Fig. 16 as the two windings 55 and 56 are identical and are shown in inner and outer positions respectively in these figures as well as in Figures 1 and 2 merely for clearness in the drawing.

Figure 16:
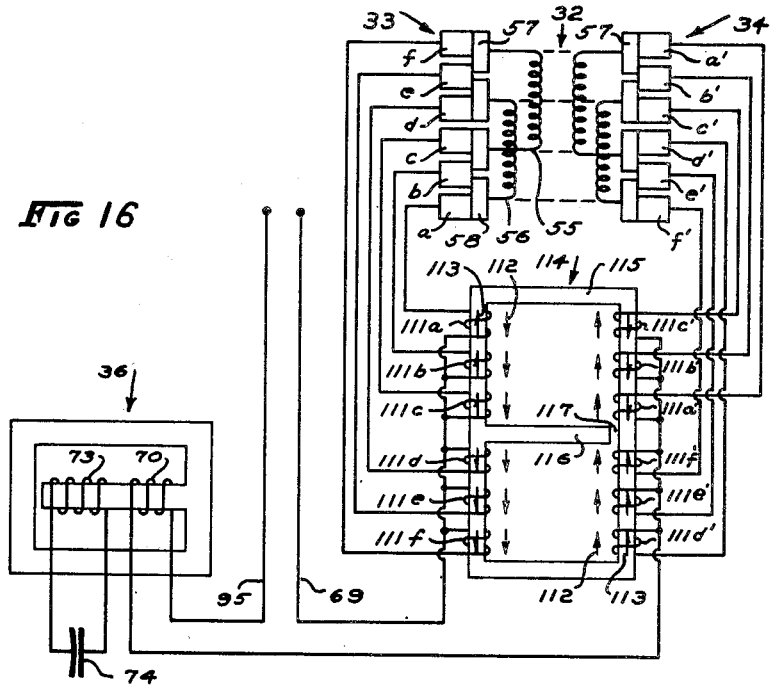
Figure 16 is a schematic diagram showing a portion of a modified commutation circuit.
Figure 17:
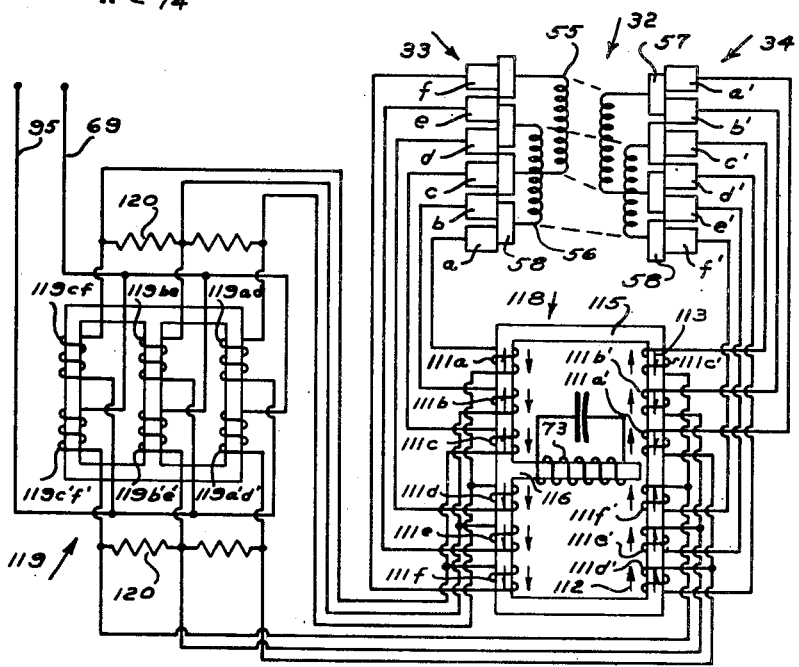
Figure 17 is a view similar to Figure 16 illustrating another modified commutation circuit.
Figure 18:
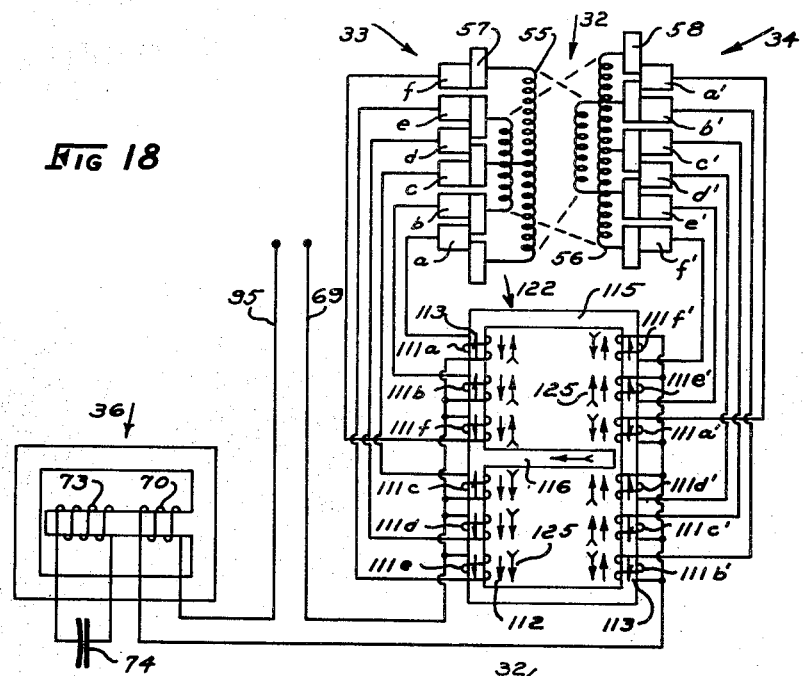
Figure 18 is a view similar to Figure 16 illustrating another modified commutation circuit.
Figure 19:
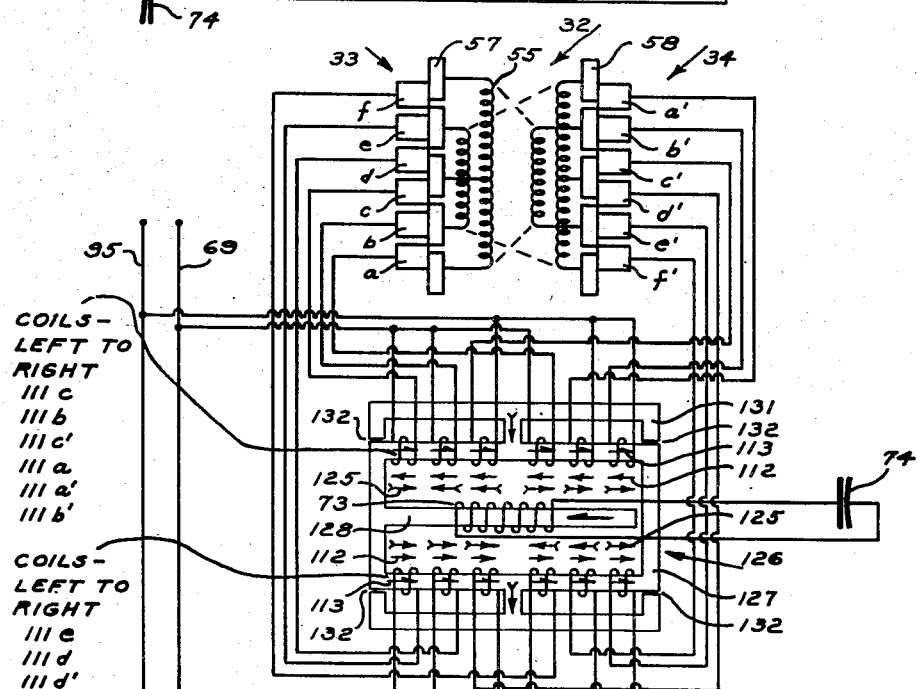
Figure 19 is a view similar to Figure 16 showing another modified commutation circuit.
Figure 20:
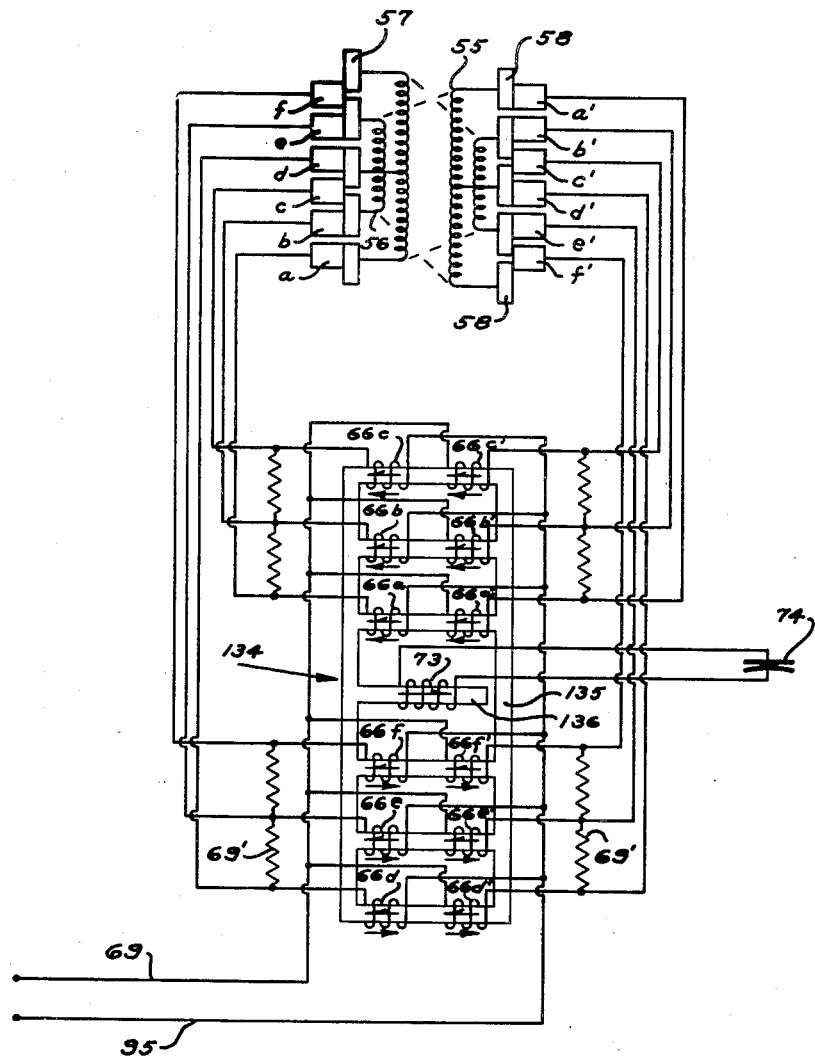
Figure 20 is a view similar to Figure 16 illustrating a further modified commutation circuit.

Of the six commutator positions, those of Figs. 16, 18 and 20 may be termed real positions each of which exists during ⅓ of the time the machine is running. The other commutator positions indicated in Figures 17, 19 and 21 may be called instantaneous positions as they represent mere transitory conditions between the real positions above discussed. Nevertheless, they must be considered, particularly under low speed operation of the motor.

It will be noted that in all commutator positions there is always a transformer voltage equal to that induced in one coil between brush elements $a$ and $d$, between brush elements $b$ and $e$ and between brush elements $c$ and $f$ of brush structure 33, and that a similar voltage exists between brush elements $f'$ and $c'$, between brush elements $e'$ and $b'$ and between brush elements $d'$ and $a'$ of brush structure 34. These voltages will be called the principal transformer voltages tending to cause armature coil short circuit currents and are the only transformer voltages present between brush elements of the same brush structure in the commutator positions of Figs. 16, 17 and 21. However, additional transformer voltages between brush elements of the same brush structure are present in the commutator positions of Figs. 18, 19 and 20 since two armature coils in series in each winding have their end terminals in contact with the brush elements of one of the brush structures. These additional voltages will be referred to as the residual transformer voltages tending to cause armature coil short circuit current.

The commutator position of Figure 16 is the same as that of Figure 1 and it is apparent that the reactor structure of Figure 1 is effective to oppose armature coil short circuit current due to the principal transformer voltages above discussed. The magnetomotive forces due to the flow of armature power currents in the reactor coils at one instant are indicated by the half arrows 101' adjacent these coils. It will be noted that they add in each leg of the core 67, those in each leg opposing those of every other leg. If the total ampere turns on each leg due to power current are the same no substantial impedance to power current will be introduced by the reactor as no flux will be produced thereby. The magnetomotive forces of the reactor coils due to to current caused by the principal transformer voltages in the short circuited coils at one instant are indicated by the full arrows 102'. These also add in each leg but the entire reactor core provides a path of low reluctance for flux due to the latter mentioned currents, which flux cuts the conductors of the reactor coils to oppose flow of armature coil short circuit currents. These currents are therefore limited to the excitation current of the core and can be held to a very low value.

The reactor structure of Figure 1 also opposes the residual voltages of the commutator positions of Figures 18, 19 and 20 in a similar manner. In fact, the difficulty with the reactor structure of Figure 1 is that it tends to too rigidly control the currents through the various brush elements. For best operation, it is desirable to have the reactor coils on the same leg of the reactor core connected to brush elements in the opposite brush structure having the same current demand for maintaining balanced currents in the two armature windings. Thus, reactor coils 66$a$ and 66$a'$ which are placed on the same leg of the reactor core as the brush elements $a$ and $a'$ are always in symmetrical position with respect to the armature windings, and the same is true with respect to brush elements $b$ and $b'$, etc. The power currents through each of the coils on one leg of the reactor are therefore equal and the requirement that the total ampere turns on each leg of the reactor be substantially the same at all times means that the current through each brush element must not vary with the commutator position. In order to provide balanced currents in the two armature windings, however, the current through each brush element must vary as pointed out above.

It has been found that the shunt resistors 69' can be employed to decrease the rigidity of current control through the brush elements without materially increasing the armature coil short circuit currents or the power dissipated in the circuit while at the same time providing for balanced currents in the armature windings. These resistors may be of relatively high value with respect to the armature resistance and are connected between brush elements $a$ and $b$, between brush elements $b$ and $c$, between brush elements $d$ and $e$, between brush elements $e$ and $f$ of the brush structure 33 and between corresponding brush elements of brush structure 34. They should not be connected between brush elements $a$ and $f$ or between brush elements $c$ and $d$ as large short circuit currents are produced thereby. The commutator circuit of Figure 1 substantially prevents flow of short circuit currents in the armature windings while at the same time satisfying the power current demand of the armature windings for balanced currents therein and produces commutation characteristics equal to or better than that of properly constructed D. C. machines.

The commutation circuit of Figure 2 employs a different type of reactor for opposing certain of the voltages between brush elements which would cause armature coil short circuit currents to flow if low impedance external circuits between brush elements were provided and the reactor is employed in conjunction with a power transformer 103 having three secondaries 103a, 103b, and 103c. One terminal of the primary winding 104 of the transformer 103 is connected to the conductors 69 and the other terminal to the conductor 95 through the primary 70 of a resonator transformer 36. The conductors 69 and 95 are connected between the center tap CT of the auto-transformer 101 and the adjustable tap AT. The reactor 107 has a single closed core 108 and a plurality of reactor coils 111a to 111f, inclusive, and also a plurality of reactor coils 111a' to 111f', inclusive. Each of these reactor coils is in series with a corresponding brush element $a$ to $f$ and $a'$ to $f'$, respectively. Brush elements $a$ and $d$ of brush structure 33 are connected together through reactor coils 111a and 111d, respectively; brush elements $b$ and $e$ are connected together through reactor coils 111b and 111e, respectively; brush elements $c$ and $f$ are connected together through reactor coils 111c and 111f, respectively, and similar pairs of the brush elements $a'$ to $f'$ of brush structure 34 are connected together through corresponding pairs of reactor coils.

The transformer secondary 103a has one terminal connected to brush elements $a$ and $d$ through reactor coils 111a and 111d and has its other terminal connected to brush elements $c'$ and $f'$ through reactor coils 111c' and 111f'. The other transformer secondaries 103b and 103c have their terminals similarly connected to corresponding pairs of brush elements through corresponding reactor coils. The magnetomotive forces at one instant caused by current flow in the reactor coils between the respective pairs of brushes due to the principal transformer voltage in each of the coils, which are connected to the brush elements by contacting commutator bars, are indicated by the full arrows 112 adjacent the core 108 of reactor 107. It will be noted that these magnetomotive forces are all equal and add around the periphery of the core 108 so that a low reluctance path for flux due to these magnetomotive forces is provided. This flux cuts the conductors of the reactor coils to oppose the single coil transformer voltages and the only current which can flow between the brush elements of the respective pairs is the magnetizing current of the core 108. This current can be made very low and no path for short circuit current between the respective pairs of brushes of each brush structure is provided by reason of the separate secondaries of the transformer 103.

Paths for armature coil short circuit currents due to residual transformer voltages do exist, however, through the secondaries of the transformer 103. One such path can be traced in Figure 2 as follows. Short circuit current can flow, for example, into the armature through brushes $c$ and $f$, through coils of the armature winding and out through brush elements $a$ and $d$ in certain positions of the commutator, for example, that of Fig. 18. In Figure 2, this current can then flow through reactor coils 111a and 111d with low impedance, then through transformer secondary 103a and reactor coils 111c' and 111f' into the armature through brush elements $c'$ and $f'$. This current can then flow through armature coils and out of the armature through brush elements $a'$ and $d'$, then through reactor coil 111a' and 111d', through transformer secondary 103c and then reactor coils 111c and 111f back to brush elements $c$ and $f$. The maximum residual transformer voltage causing such currents is, however, never greater than one-half the voltage induced in a single coil and the impedance of the long circuit just traced in Figure 2 holds this current to a low value.

The circuit of Fig. 2 places substantially no restrictions upon the distribution of power current between the brush elements necessary to maintain balanced currents in the armature windings. The magnetomotive forces due to flow of power current through the reactor coils is indicated by the half arrows 113 on the core 108. These magnetomotive forces balance out since the reactor coils all have the same number of turns and the current entering the armature must equal the current leaving the armature. The net ampere turns due to power current flow in the reactor coils is, therefore, equal to zero and substantially no impedance is presented to armature power current by the reactor 107. The leakage reactance of the secondaries of the transformer add to resist flow of armature coil short circuit current and, if necessary, this leakage reactance can be increased at the expense of somewhat restricting the necessary variation of power current through the brush elements. The restriction necessary to substantially prevent flow of armature coil short circuit current is not sufficient to cause commutation difficulties. The resulting increased series inductive reactance in the armature circuit can be neutralized by increasing the effective capacitive reactance of the resonator transformer 36. The commutation circuit of Figure 2, in common with the commutation system of Figure 1, effectively prevents flow of armature coil short circuit currents and produces commutation characteristics equal to or better than those obtained in the best direct current machines.

Figure 3 is a fragmentary circuit illustrating how the commutation circuit of Figure 1 may be adapted to polyphase operation of the motor. That is to say, the auto-transformer 105 of Fig. 2 and the associated polyphase excitation circuit can be substituted in Fig. 1 for the auto-transformer 94 and the associated single phase excitation circuit thereof. This can be accomplished by omitting the auto-transformer 94 and the excitation circuit of Fig. 1, substituting the circuit of Figure 3 and connecting the conductors 69 and 95 of Fig. 1 to the center tap CT and the adjustable tap AT of the auto-transformer 101 of Fig. 3.

Figure 4 illustrates how the commutation circuit of Fig. 2 may be adapted to a single phase motor circuit such as shown in Fig. 1. This is done by merely substituting in Fig. 2, the single phase excitation circuit of Figure 4 for the polyphase excitation circuit of Fig. 2. That is to say, the auto-transformer 101 and associated excitation circuit of Fig. 2 is omitted, the circuit of Figure 4 substituted and the conductors 69 and 95 of Fig. 2 connected to the center tap CT and the adjustable tap AT of the auto-transformer 94 of Figure 4. This converts Fig. 2 from a polyphase circuit to a single phase circuit.

One of the advantages of the commutation system of the present invention is that brush elements of very low resistance may be employed. Even in direct current machines it is usually necessary to employ brushes having considerable resistance to prevent sparking and arcing at the commutator. In the commutation systems of the present invention, where any armature coil short circuit currents flow through external connections to the brush elements, there is no reason for using high resistance brushes and the heat produced at the commutator by current flow through high resistance brushes is therefore eliminated. Brushes having conductivities substantially as great as that of copper can therefore be employed.

Figure 16 illustrates another commutator circuit which does not require a power transformer having a plurality of secondary windings. In this figure, the entire armature winding is not shown, only the coils undergoing commutation being illustrated, the rest of the armature windings being represented by the dotted lines in the figure. The reactor structure 114 is the same as that shown in Fig. 2, except that the core 115 has a magnetic shunt 116 providing an air gap 117; the coils 111a to 111f, inclusive, have their terminals remote from the brush elements a to f, respectively, all connected to a single conductor which may be the conductor 69 of Figures 1 and 2, and the reactor coils 111a' to 111f', inclusive, may have their terminals remote from the brush elements a' to f', respectively, connected to a single conductor leading to the primary 70 of a resonator transformer 36. It will be apparent that this eliminates the power transformer 103 of Fig. 2. The magnetomotive forces due to armature power currents and shown by the half arrows 113 are exactly the same as in Fig. 2. These magnetomotive forces add to produce a resulting flux through the magnetic shunt 116. The magnetomotive forces shown by the arrows 112 due to currents caused by the principal transformer voltages induced in the individual coils undergoing commutation add around the periphery of the core 115. This arrangement of the reactor coils upon the core 115 provides high inductive reactance to flow of armature coil short circuit current between respective pairs of brushes a and d, b and e, etc.

The voltages set up in the reactor coils oppose the transformer voltages in the individual coils undergoing commutation, thus preventing flow of armature coil short circuit currents due to short circuiting the individual coils and cancelling out the principal voltages causing armature short circuit currents. In certain positions of the commutator there are, however, residual short circuit voltages which are not effectively opposed or cancelled out by the commutation circuit shown in Fig. 16. However, particular real commutator position shown in Figure 16 does not produce any residual voltage due to short circuiting of armature coils and in this position the reactor structure 114 completely balances out armature coil short circuit voltages, thus preventing flow of armature coil short circuit current. In the real commutator positions shown in Figures 18 and 20, however, such residual transformer voltages equal to as much as one coil voltage do appear due to the fact that more than one armature coil in each of the armature windings are short circuited through the external circuits connected to the brush elements of the brush structures. Such residual voltages are not completely opposed by the reactor structure of Figure 16 thus far discussed. Although the reactor shunt 116 is introduced by Figure 16, it will be apparent that its usefulness, in adding a flux path to reduce reactance opposing circulating current due to residual transformer voltages, is more fully taken advantage of in a different arrangement as will be shown in connection with Figure 18. For complete opposing of the transformer voltages of the coils undergoing commutation, the transformer voltages impressed across each of the reactor coils would have to be equal but this is not the case. In fact, certain of the reactor coils become short circuited secondary transformer windings for other coils acting as primary transformer windings. Armature coil circulating or short circuit currents can, therefore, flow through all of the brush elements. The net result is, however, to partially oppose the flow of all armature coil short circuit currents so that the reactor structure 114 of Fig. 16, without the magnetic shunt, is a major improvement over merely connecting all of the various brush elements together or the equivalent arrangement of employing a single wide brush element on each side of the commutator.

The magnetic shunt 116 is effective to insert series inductive reactance into the armature circuit. However, capacitive reactance of the resonator transformer 36 may be increased to cancel out the additional inductive reactance inserted in series in the armature circuit by the reactor structure 114.

The circuit of Figure 17 is similar to that of Figure 16 except that the separate resonator transformer 36 has been omitted and the secondary winding 73 of the resonator transformer has been placed on the magnetic shunt 116 of the core 115 to form a combined reactor and resonator transformer 118 and also an additional reactor structure 119 has been provided to oppose the residual transformer voltages. The secondary 73 of the resonator transformer can be placed on the magnetic shunt 116 as the magnetomotive forces due to power current and indicated by the half arrows 113 add to cause a flux to thread the magnetic shunt 116. Otherwise the reactor 118 is the same as the reactor 114 of Figure 16. The placing of the winding 73 upon the magnetic shunt introduces series capacitive reactance into the armature circuit but substantially eliminates any action of the reactor 118 to limit armature coil short circuit currents due to the residual voltages above discussed.

These residual voltages can, however, be opposed by providing the second reactor structure 119. This reactor structure is provided with a core having three legs upon which are positioned the reactor coils 119ad, 119be, 119cf, 119a'd', 119b'e' and 119c'f'. The reactor coil 119ad carries the power current of the brush elements a and d; the reactor coil 119be carries the power current of the brush elements b and e; etc. The action of the reactor 119 is very similar to that of reactor 66 of Fig. 1 and opposes flow of short circuit currents due to the residual transformer voltages induced in the armature coils, the principal transformer voltages of the armature coils being opposed by the reactor 118. Reactor coils connected to brush elements always having the same current demand for balanced power currents in the armature windings are placed on the same leg of the reactor core. As in the reactor of Figure 1, the requirement of the reactor that the total ampere turns on each reactor leg be very nearly the same places somewhat too rigid a restriction on the distribution of power current among the various brush elements and shunt resistors 120 are provided to reduce this restriction. With the shunt resistors the circuit of Figure 17 produces excellent commutation characteristics from very low motor speeds to very high motor speeds.

It will be apparent that the combined resonator transformer and reactor 118 of Figure 17 may be substituted for both the reactor 107 and resonator transformer 36 of Figure 2. This can be accomplished in Fig. 2 by omitting the resonator transformer 36 of Figure 2 and connecting the combined resonator and reactor 118 of Figure 17 in place of the reactor 107 of Fig. 2. The resulting operating characteristics are substantially the same as those of the circuit of Figure 2. The combined reactor and resonator transformer 118 of Figure 17 may also be substituted for the reactor 114 and resonator transformer 36 of Figure 16. This may be accomplished by omitting the resonator transformer 36 of Fig. 16 and winding its secondary 73 upon the magnetic shunt 116 of the reactor 114 of Fig. 16. The resulting operating characteristics are substantially equivalent to the circuit of Fig. 16 as above discussed, that is to say, the resulting circuit is adequate for high speed operation of the motor.

Another arrangement of the reactor employed in conjunction with a separate resonator transformer 36 is shown in Figure 18. The reactor 122 of this figure has a core 115 which may be entirely similar to the core 115 of Figure 16. However, the various reactor coils 111a to 111f, inclusive, and 111a' to 111f', inclusive, are arranged on the core in a different manner. The magnetomotive forces due to flow of armature power current through the various coils are indicated by the half arrows 113 and it will be noted that certain of these magnetomotive forces oppose each other to decrease the resulting magnetomotive force causing flux to thread the magnetic shunt 116. This introduces less inductive reactance into the series armature circuit than is the case of the circuit of Figure 16. This arrangement also effectively introduces inductive reactance into all of the circuits provided for flow of armature coil short circuit currents, i. e., some of the flux caused by magnetomotive forces set up by such short circuit currents traverses the magnetic shunt 116. The capacitive reactance of the resonator transformer 36 may be increased to cancel out the additional inductance reactance inserted in series in the armature circuit by the reactor structure 122, but has no effect upon the inductive reactance introduced into the paths for armature coil short circuit current. This latter inductive reactance can be increased sufficiently to effectively oppose armature coil short circuit current without excessively increasing the series inductive reactance of the armature power circuit. The increased series inductive reactance in the armature series circuit does tend to place some limitation upon the distribution of the power current between the various brush elements but by varying the air gap in the core 115 a balance can be found which holds the armature coil short circuit currents to a very low value while at the same time permitting adequate distribution of current between the various brush elements. The circuit of Figure 18 can, therefore, be employed to produce excellent commutation with motors having a speed range from substantially zero speed to any high speed which will not cause mechanical failure of the motor. The magnetic shunt 116 can even be omitted for high speed operation. As in Figure 16, the magnetomotive forces due to the principal transformer voltages induced in the coils undergoing commutation shown by the arrows 112 add around the periphery of the core 115 to substantially balance out these principal voltages. An attempt has been made to show one instantaneous position of the magnetomotive forces due to the residual short circuit voltages. These magnetomotive forces are shown by the feathered arrows 125 and it will be observed that they in general add to cause flux to traverse the magnetic shunt 116. It has been found that the circuit of Figure 18 increases the inductive reactance inserted into the circuits through which armature coil short circuit current can flow over that of Figure 16. Thus, the commutation circuit of Figure 18 is somewhat more effective than the commutation circuit of Figure 16.

Figure 19 illustrates a still further modified commutation circuit which can be satisfactorily employed throughout an extremely extended speed range in the motor and which combines the resonator transformer with the reactor. In this figure, the reactor 126 has a core 127 providing a magnetic shunt 128 upon which the secondary 73 of the resonator transformer is wound. It will be noted that the magnetomotive forces due to power armature current, shown by the half arrows 113, all add to cause flux to thread the magnetic shunt 128. This causes the resonator transformer winding 73 and condenser 74 to insert capacitive reactance into the series armature circuit. Again, the magnetomotive forces due to current caused by the principal transformer voltages induced in the individual coils undergoing commutation and shown by the arrows 112 all add around the periphery of the core 127 to substantially balance out such voltages. Shunt paths for flux caused by flow of currents due to the residual coil transformer voltages are provided by the magnetic shunt structures 131. These shunt paths are connected with the main core adjacent the center of side portions of the main core and have air gaps 132 to prevent rapid saturation of the iron. An attempt has been made to illustrate the magnetomotive forces for one position of the commutator due to currents caused by the residual coil voltages discussed above. These magnetomotive forces are indicated by the feathered arrows 125. It will be noted that in general the latter magnetomotive forces tend to cause flux to flow through the shunt paths 131, thus inserting a high inductive reactance into the paths for flow of residual armature coil short circuit current. The reactor of Figure 19 produces excellent commutation characteristics. It is probably the most effective for preventing armature coil short circuit currents while at the same time introducing substantially no series inductive reactance into the series power armature circuit and allowing adequate distribution of power current between the various brush elements.

A further motor circuit including a reactor structure 134 is illustrated in Figure 20. This reactor structure includes a core 135 having six parallel legs and a magnetic shunt 136. The circuit of Fig. 20 is the same as that of Figure 1 except for the magnetic shunt and the omission of a separate resonator transformer 36, the secondary 73 of such transformer being wound on the magnetic shunt 136 of the reactor core 135. This is possible as the magnetomotive forces due to flow of power current add to cause flux to thread the magnetic shunt. The circuit of Figure 20 thus combines the separate reactor and resonator transformer of Fig. 1 into a single structure and has operating characteristics substantially the same as those discussed at length with respect to Fig. 1.

Figure 21:
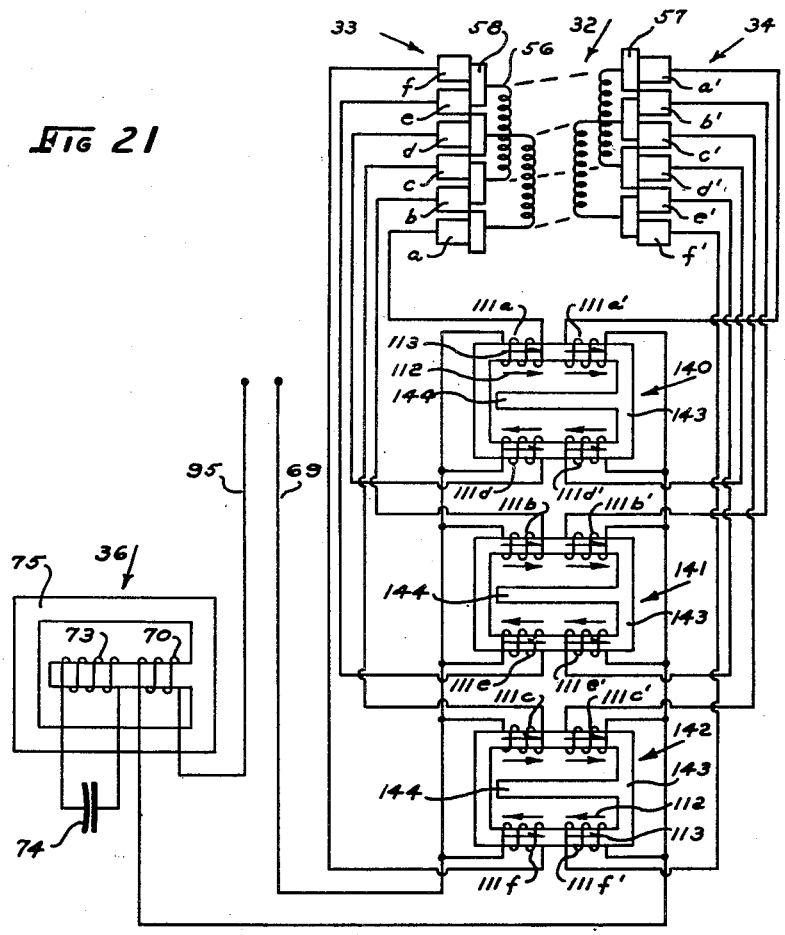
Figure 21 is a view similar to Figure 16 illustrating a further modified commutation circuit.

Figure 21 illustrates a commutation circuit including three separate reactors 140, 141 and 142. These reactors have similar cores 143 each provided with a magnetic shunt 144. The brush elements which always have the same current demand for balanced currents in the armature windings have their respective reactor coils placed on the same core. Thus the reactor coils 111a, 111d, 111a' and 111d' are on the core of reactor 140. The reactor coils 111b, 111e, 111b' and 111e' are on the core of reactor 141. The reactor coils 111c, 111f, 111c' and 111f' are on the core of reactor 142. The magnetomotive forces due to currents caused by the principal transformer voltages in individual armature coils are indicated by the arrows 112 in the various reactor cores and in each core these magnetomotive forces add around the periphery of the reactor cores. The principal transformer voltages in these coils are therefore opposed by the reactors to prevent short circuit current. The magnetomotive forces due to power currents, indicated by the half arrows 113, add to cause flux to thread the magnetic shunt 144. This places series inductive reactance in the armature power circuit, which reactance may, however, be cancelled by increasing the series capacitive reactance also inserted in the circuit by the resonator transformer 36. The magnetomotive forces due to residual transformer voltages in the short circuited armature coils are not indicated but also add to cause flux to thread the magnetic shunt 144, thus inserting inductive reactance in the current paths for currents caused by such residual voltages. This inductive reactance is not cancelled by the capacitive reactance of the resonator transformer 36. The short circuited currents can be held to a very low value by the reactor circuit of Figure 21 without excessively increasing the series inductive reactance in the power armature circuit which must be cancelled by the capacitive reactance of the resonator transformer. This circuit also provides an adequate distribution of the current between the various brush elements to enable the power armature currents to be balanced in the two armature windings and in the two halves of each winding. The system of Figure 21 is effective to provide excellent commutation characteristics from very low speeds to extremely high speeds.

Figure 22:
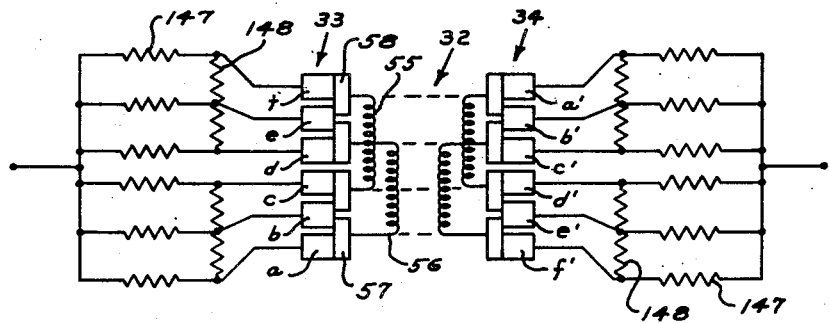
Figure 22 is a fragmentary view similar to Figure 16 showing a still further modified commutation circuit suitable for D. C. machines.

To continue the disclosure of the commutation phase of the present invention, Figure 22 illustrates a commutation circuit for improving the commutation characteristics of direct current machines. By employing the dual armature winding and the multiple brush element structures described above, all short circuit currents in the coils under commutation must flow through the external connections to the brush elements. These short circuit currents can be held to a low value by employing a resistor 147 in series with each of the brush elements. Such resistors may be of relatively low value while still drastically limiting armature coil short circuit currents because of the relatively low voltages across the coils undergoing commutation in the D. C. machines. Also, low resistance brush elements may be employed so that the power loss due to resistance in the armature circuit is removed from the commutator circuit to the external circuit. This reduces heating of the commutator and enables a smaller commutator to be employed in many instances. The actual resistance inserted into the commutator circuit is relatively small as the resistors 147 are in parallel so far as flow of power current is concerned, although pairs of resistors are in series so far as armature coil short circuit is concerned. Commutation of direct current machines may be materially improved by employing only the series resistors 147. However, these resistors do tend to restrict the current distribution between the various brush elements necessary for balancing the armature winding currents and an even greater improvement may be obtained by employing shunt resistors 148 between certain of the brush elements, similar to the resistors 69' of Figure 1. These resistors may be of relatively high resistance, as the current flow therethrough need not be great to improve the balancing of the currents in the armature windings. Also, the power loss in these resistors is very small. The commutation system of Figure 22 provides for marked improvement in direct current machines otherwise exhibiting commutation difficulties.

The commutation system of the present invention may also be applied to static machinery such as tap changing transformers so that extremely small voltage steps may be obtained and the contacts moved at any desired rate of speed or stopped at any point without producing large short circuit currents. An autotransformer 149 (Figure 23) having a closed core 150 has been selected for purposes of illustration. This transformer has two windings, one winding 151 being positioned upon one leg of the core and the other winding 152 being positioned upon the other leg of the core. The windings are connected to the conductors $L_1$ and $L_2$ of a single phase line through reactor coils on a reactor 153 having a closed core 154. Thus, winding 151 is connected to $L_1$ through reactor coil 155 and to $L_2$ through reactor coil 156. Similarly, transformer winding 152 is connected to $L_1$ through reactor coil 157 and to $L_2$ through reactor coil 158. The reactor coils 155 to 158, inclusive, are necessary to prevent flow of short circuit currents in the windings 151 and 152 due to a single brush element of the variable tap connecting the two windings together. That is to say, the coils 155 to 158, inclusive, prevent any substantial flow of current between the ends of the transformer windings 151 and 152 where they are connected to the lines $L_1$ and $L_2$.

The two transformer windings 151 and 152 have the same number of turns and magnetizing current flows through these two windings between the line $L_1$ and $L_2$ to provide a transformer flux in the core 150 of the transformer.

The magnetomotive forces due to this magnetizing current are indicated by the half arrows 159 on the core 150 of the transformer and it will be noted that the windings are connected so that these magnetomotive forces add around the periphery of the core 150 so that back voltages induced in the two windings 151 and 152 by transformer flux limit the magnetizing current to a small value just sufficient to excite the core 150 to the desired flux density. The magnetomotive forces due to flow of transformer magnetizing current or any other series flow of current through the transformer windings and thus through the coils 155 to 158 on the reactor 153 are indicated by the half arrows 160 on the reactor core 154, and these magetomotive forces balance out so that the reactor presents substantially no impedance to flow of such series current. A plurality of contacts or commutator bars 161 and 162 are provided for transformer windings 151 and 152. Equally spaced taps on the winding 151 are connected to alternate commutator bars 161 and equally spaced taps on the winding 152 are connected to alternate commutator bars 162. It will be noted that the taps on winding 151 are intermediate the taps on winding 152 so that the actual voltage between adjacent commutator bars is equal to one-half the voltage between adjacent taps on either one of the windings 151 or 152.

Any fixed taps can be taken from the two transformer windings. For example, the center tap CT of the circuit of Figure 1 may comprise the two conductors 163 and 164 connected to corresponding central points on the two windings 151 and 152 and to the conductor CT through reactor coils 165 and 166, respectively, on the reactor core 154, the coils 165 and 166 presenting high impedance to flow of current between the conductors 163 and 164 but presenting low impedance to flow of current between the conductor CT and the transformer windings. Similarly, any other tap such as the fixed tap FT of Figure 2 may be connected to corresponding points on the two transformer windings 151 and 152, for example through conductors 167 and 168. These conductors are connected to the conductor FT through reactor coils 169 and 170, respectively, so that the reactor coils 169 and 170 present high impedance to flow of current between the conductors 167 and 168 but present low impedance to flow of current between the conductor FT and the transformer windings. It will be apparent that secondary current may be taken from the circuit between any two of the conductors L₁, FT, CT or L₂ through paths of low impedance in the reactor 153 while at the same time the reactor 153 prevents flow of currents between the transformer windings through any of the connections thereto thus far discussed.

The multiple brush structure including brush elements a to f, inclusive, may be employed to take power current at an adjustable voltage between the conductor AT and any of the conductors L₁, FT, CT or L₂. As in the commutation circuits discussed above, three of the brush elements a to c, inclusive, span approximately two commutator bars and otherwise conform to the requirements stated, so that no transformer coil can be directly short circuited through the brush elements. All short circuit currents through such coils must flow through the external brush circuit. Transformer voltages tending to cause short circuit currents to flow through the external brush circuit are present and a reactor 171 is employed to drastically limit such short circuit currents. The reactor coils 172a to 172f, inclusive, present high impedance to flow of current between pairs of brushes spanning a transformer coil. That is to say, they present high impedance to flow of current between brush elements a and d, between brush elements b and e and between brush elements c and f while at the same time presenting low impedance to flow of power current through the various reactor coils.

As in the motor commutation circuits above discussed, residual transformer voltages are present between certain pairs of brush elements. The core 173 of the reactor 171 is provided with a magnetic shunt 174 to provide inductive reactance opposing flow of short circuit currents due to such residual transformer voltages. This magnetic shunt 174 also inserts a small amount of series inductive reactance into the power circuit including the conductor AT, but this latter inductive reactance may be made small in comparison to the inductive reactance resisting flow of residual transformer coil short circuit currents. One reason for this is that the various reactor coils 172a to 172f are all in parallel for flow of such power current whereas two of these coils are always in series so far as flow of transformer coil short circuit currents is concerned. The reactor circuits of Figure 23 hold all of the possible short circuit currents to a negligible value for any position of the brush elements a to f, inclusive, on the commutator bars 161 and 162.

Figure 23:
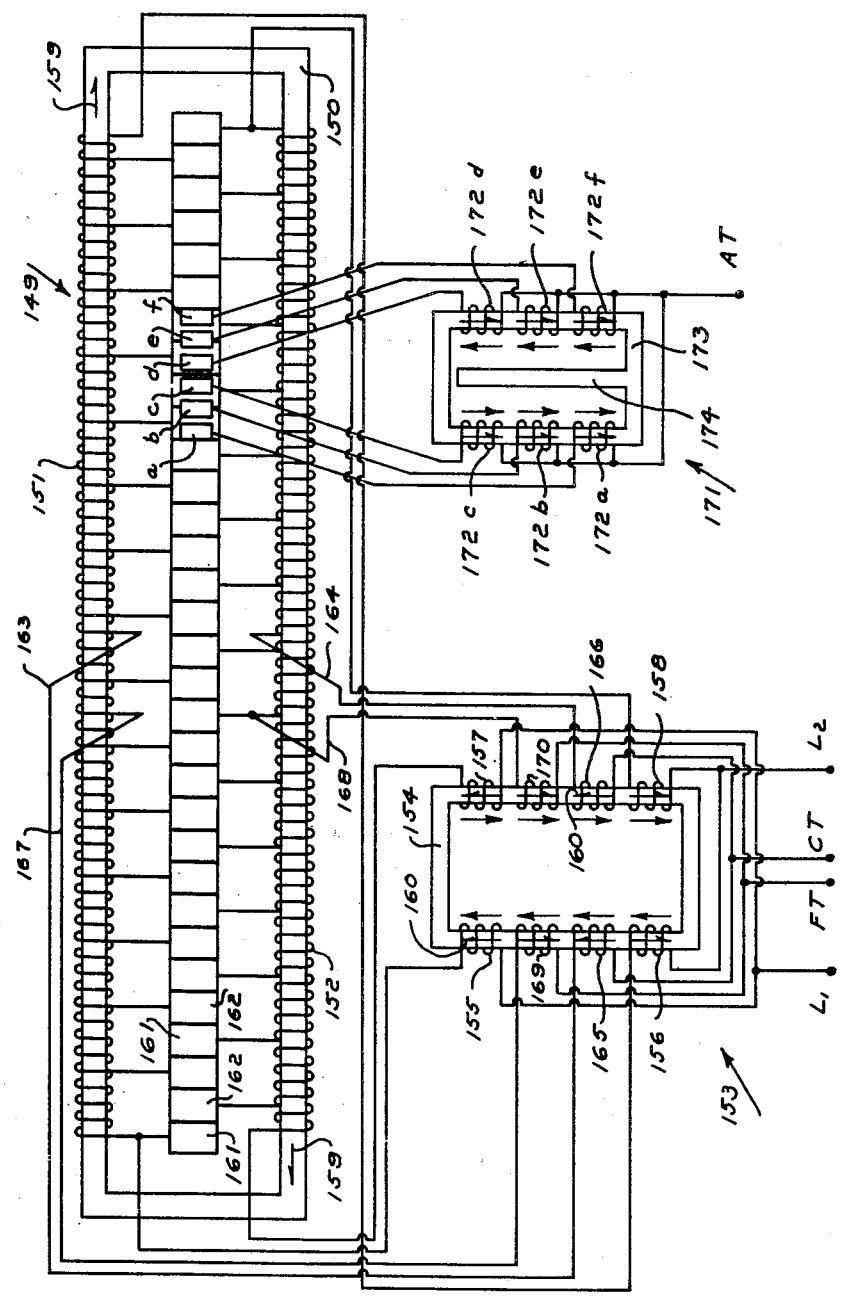
Figure 23 is a schematic diagram of an adjustable voltage autotransformer suitable for employment in the circuits of the present invention.

The problem of current distribution between the various brush elements also arises in the tap changing transformer circuit of Figure 23. The reactor 153 tends to hold all currents in the two transformer windings 151 and 152 equal. This means that the currents through the various brush elements a to f, inclusive, must vary in different positions of the brush elements upon the commutator bars. Otherwise a high series inductive reactance is introduced into the power circuit. The only restriction placed upon the power currents through the brush elements by the reactor 171 is that the sum of the currents through brush elements a, b, and c must substantially equal the sum of the currents through brush elements d, e and f. This current distribution is adequate for providing equal currents in the two transformer windings. Also, any of the reactor systems of Figures 1, 16 to 18, inclusive, 20 and 21 can be employed for the reactor 171 of Figure 23 by eliminating half of the reactor coils thereon, i. e., the coils connected to brush elements a' to f', inclusive. Even the reactor systems of Figs. 17 and 20 having a resonator transformer secondary 73 wound on a magnetic shunt in the figures referred to can be employed, the resonator transformer inserting sufficient capacitive reactance into the series power circuit to overcome any series inductive reactance introduced to prevent flow of residual transformer coil short circuit current. Such a resonator winding thus substantially eliminates series reactance due to employment of the auto-transformer in the circuit, but at the same time does not remove the inductive reactance preventing flow of transformer coils short circuit current.

Although an auto-transformer has been illustrated in Figure 23, it is apparent that the tap changing system of Figure 23 can be applied to transformers having a separate conventional primary winding for exciting the core, in which case power can be taken from the transformer between any two of the conductors $L_1$, FT, CT, $L_2$ or AT. In any type of tap changing transformer having the tap changing system of Figure 23, the number of voltage steps is very much greater than the number of commutator bars. Taking into consideration that at least six brush elements must be in contact with the commutator bars in even the end positions of the brush elements on the commutator, the number of steps is approximately equal to six times the quantity equal to the number of commutator bars less 8 or 144 steps in the case of a transformer having 32 commutator bars.

Absolutely complete prevention of armature coil short circuit currents in all commutator positions does not appear possible in commutation circuits providing for perfect distribution of current among the brush elements to balance or equalize the current in the dual windings fed thereby. As the commutation circuits tend to approach a condition of substantially perfect elimination of such short circuit currents, they also tend to force a current distribution between the various brush elements which prevents balancing of the currents in the dual armature windings or dual transformer coils. Practical or compromise circuits can, however, be provided in accordance with the principles of the present invention above discussed to sufficiently limit short circuit currents so that excellent commutation can be produced both for adjustable voltage transformers and for motors in all speed ranges. In other words, short circuit currents can be held to a negligible value while allowing adequate power current distribution among the brush elements.

Although the reactor structures in the commutation circuits utilizing reactors have been shown on a large scale for the purpose of clarity, it will be understood that the actual reactor structures are small in comparison to the motor or transformer with which they are employed and require a relatively few number of turns in each reactor coil. Such reactor structures are relatively inexpensive and circuits employing reactors only are therefore less expensive than circuits employing power transformers with a plurality of secondaries.

Figures 24 to 28, inclusive, illustrate further modifications of alternating current adjustable speed shunt motor circuits to which the principles of the present invention are applicable. For the sake of simplicity, the multiple brush element structures, dual armature windings and associated circuits for preventing short circuit currents have been omitted from these figures. It will be understood, however, that the multiple brush structures and an armature coil short circuit preventing circuit such as those shown in Figures 1 to 4 or 16 to 21, inclusive, will be employed in the circuits of Figures 24 to 28, inclusive, and that the motors have dual armature windings (not shown) in order to provide effective commutation.

Figure 24:
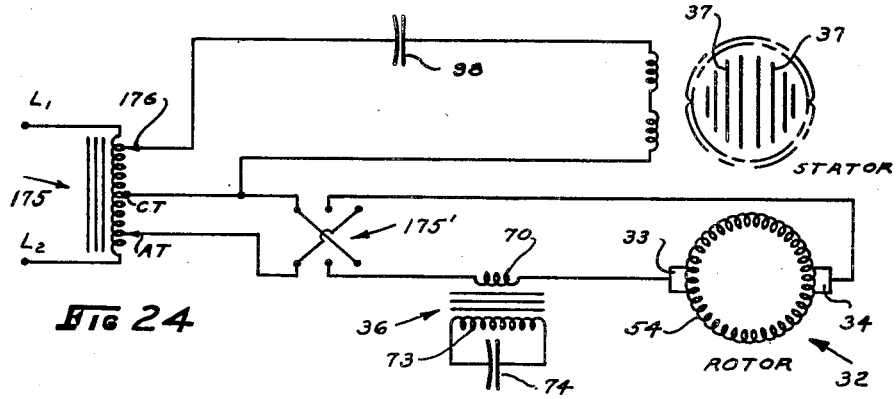
Figure 24 is a simplified schematic diagram illustrating another modification of a motor circuit.

The circuit of Figure 24 is similar to the circuit of Figure 1 and the vector diagram of Figure 15 is entirely applicable. The essential difference between these two figures is that a single autotransformer 175 is employed in Figure 24 to furnish both an adjustable voltage field excitation supply and an adjustable voltage armature power supply. Thus the armature circuit power may be taken from the autotransformer between the center tap CT and the adjustable tap AT so that the lower half of the autotransformer 175 may be employed for speed control by variation of armature voltage, reversing being accomplished by means of a reversing switch 175'. The excitation voltage may be taken between the center tap and another adjustable tap 176 on the upper half of the autotransformer to provide for speed adjustment by varying the field voltage. The circuit shown in Figure 24 is particularly suitable, for example, for operating a 110-volt motor from a 220-volt supply or a 220-volt motor from a 440-volt supply. The condenser 98 in the excitation circuit, in conjunction with the resonator transformer 36 and a proper commutation circuit, not shown in Figure 24, maintains the mutual flux in phase with the armature power current.

Figure 25:
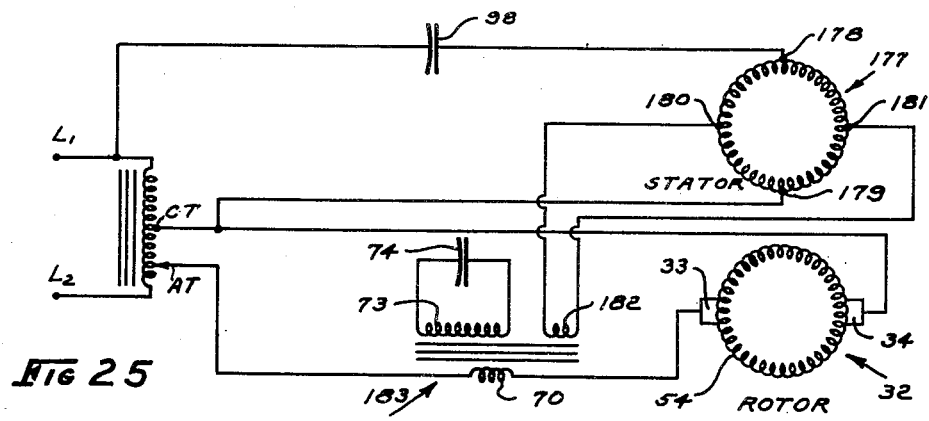
Figure 25 is a view similar to Figure 24 illustrating a circuit for a modified motor.
Figure 26:
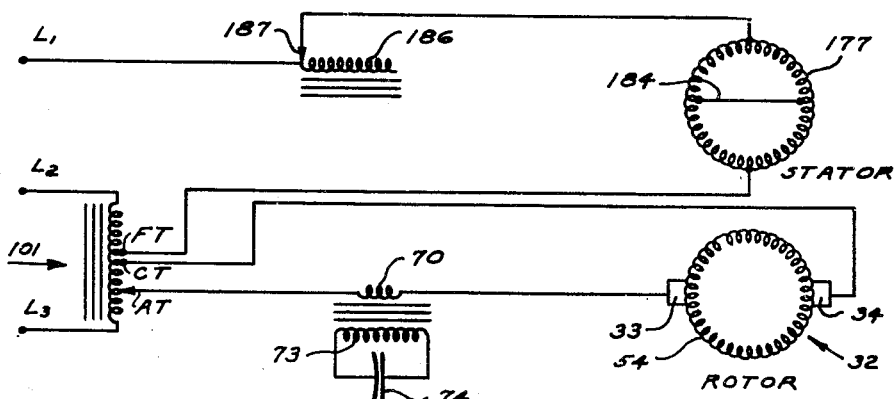
Figure 26 is a view similar to Figure 24 showing a circuit for another modified motor.

Figure 25 illustrates a single phase circuit similar to that of Figure 24 and the vector diagram of Figure 15 is also applicable thereto. No provision is made for varying the excitation voltage but the adjustable tap AT for the armature circuit may be carried past the center tap to reverse the motor. The motor of Figure 25 also omits the U-bar winding having the elements 37 of Figure 24 and instead employs a single distributed closed stator winding 177. The excitation voltage is applied to this winding in the excitation axis between the terminals 178 and 179 to produce a flux in the excitation axis. The distributed winding 177 is, however, short circuited in the power axis between the terminals 180 and 181 through a low impedance coil 182 on a resonator transformer 183. This resonator transformer differs from the resonator transformer 36 of Figure 24 only in having the tertiary coil 182 positioned to be subjected to the same flux as the other windings. The tertiary coil 182 inserts a small amount of capacitive reactance in the quadrature or power axis of the distributed winding 177 to overcome any leakage reactance of this winding effective in the power axis. Thus, the winding 177 is extremely effectively short circuited in the power axis and in addition to functioning as an excitation winding also functions in the same manner as the short circuited U-bar stator winding of Figure 24. The mutual flux in the motor is substantially entirely confined to the excitation axis even in motors having a distributed stator winding. The operation of the motor of Figure 26 is substantially identical with the motors discussed at length above having the U-bar short circuited stator winding. The motor of Figure 25 can obviously be adapted for three phase operation in substantially the same manner as the motor of Figure 26.

The motor circuit of Figure 26 is similar to the circuit of Figure 25 except that it is arranged for three-phase operation of the motor and the stator distributed winding 177 is directly short circuited by a quadrature short circuit connection 184. This circuit operates in a manner substantially identical with that of the circuit of Figure 2 and the vector diagrams of Figures 11 to 14, inclusive, are entirely applicable. The quadrature short circuit connection 184 performs the same function as the short circuited U-bar windings of Figure 24 and the short circuit connection of Figure 25, although it is not quite as effective in maintaining the mutual flux substantially entirely in the excitation axis. This means that a greater burden is placed on the excitation circuit and in general the better of the commutation circuits discussed above should be employed. A slightly modified field excitation circuit is also shown in this figure involving an adjustable reactor 186.

If the reactor 186 has the same ratio of leakage reactance to resistance that the stator winding 177 has in the excitation axis, the applied excitation voltage may be varied by moving the adjustable tap 187 of the reactor 186 to vary the speed of the motor without disturbing the phase relationship between the mutual flux and the armature power current.

Figure 27:
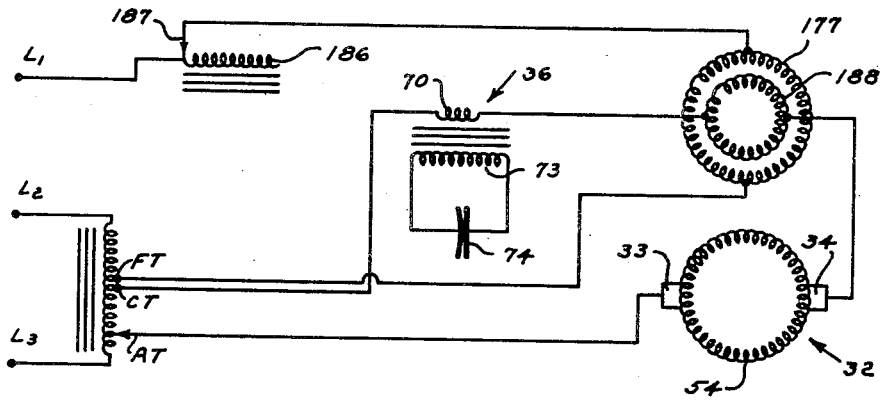
Figure 27 is a view similar to Figure 24 showing a circuit for another modified motor.

Figure 27 illustrates a three-phase motor circuit which is similar to that of Figure 26 except that two separate windings are employed on the stator. The excitation winding 177 may be entirely similar to the excitation winding 177 of Figures 25 and 26 but is not short circuited in the power axis. The additional stator winding 188 is a distributed winding of low impedance having a relatively few number of turns and is connected in series with the armature, the connections to the winding 188 being in the quadrature or power axis. The armature power current flows through the winding 188 and is therefore in phase with the power current through the armature. The resonator transformer 36 may be placed anywhere in the armature series circuit. Armature power currents in the armature windings tend to rotate the mutual flux in the motor iron by armature reaction, but the winding 188 may be connected so that its magnetomotive force exactly balances the magnetomotive force of the power current in the armature, to at all times maintain the mutual flux substantially entirely in the excitation axis. The winding 188 can therefore perform substantially the same function as the U-bar short circuit winding of Figure 24 so that the vector diagrams of Figures 11 to 14, inclusive, are applicable. In addition, the magnetomotive force due to power currents in the winding 188 may be made slightly larger and in opposition to the magnetomotive force due to power currents in the armature windings to set up a flux in the power axis causing a speed voltage to be generated in the coils undergoing commutation in a direction which aids in the reversal of the armature power current and thus aids in commutation. Nevertheless, one of the commutation circuits including dual armature windings and divided brush structures for preventing armature coil short circuit currents described at length above must be employed in the motor of Figure 27 to provide effective commutation.

Figure 28:
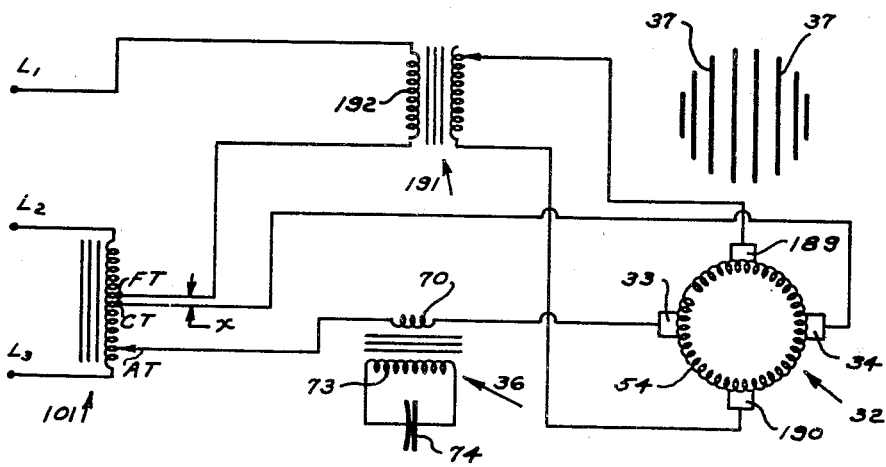
Figure 28 is a view similar to Figure 24 showing a circuit for a further modified motor.

As shown in Figure 28, it is entirely possible to apply the excitation voltages to the armature instead of to a winding on the stator. A U-bar stator winding similar to that shown in Figure 24 and involving U-bar elements 37 is preferably employed to retain the mutual flux in the excitation axis. In such a circuit the connections to the excitation brush structures 189 and 190 must be electrically isolated from the connections to the power brush structures 33 and 34. One way of accomplishing this is to provide an excitation transformer 191 having its primary 192 connected between the line $L_1$ and a fixed tap FT on an auto-transformer which may be the same as the auto-transformer 101 of Figure 2, the fixed tap being displaced from the center tap CT by a distance $x$. One of the commutation circuits discussed above for preventing the flow of armature coil short circuit currents will be employed in both the excitation circuit and in the armature circuit although such circuits are not shown in Figure 28 to avoid complication. The voltages tending to cause armature coil short circuit currents through the brush structures 189 and 190 are primarily speed voltages as the coils being commutated by these brush structures are directly in the power axis. Such speed voltages have exactly the same effect in tending to produce armature coil short circuit currents in the excitation brush structures as the transformer voltages have in the power circuit brush structures. The motor of Figure 28 operates in substantially the same manner as the motor of Figure 2 and the vector diagrams of Figures 11 to 14 are entirely applicable. It should be apparent that the motor of Figure 28 can be converted to single phase operation by employing the condenser 98 of Figure 1 in series in the excitation circuit.

From the above disclosure it will be seen that I have provided an adjustable speed alternating current motor of the shunt type capable of operation over an extended speed range with commutation characteristics as good or better than that found in the better direct current machines and with speed-load characteristics substantially the same as a direct current shunt motor. One reason for the excellent speed-load characteristics of the shunt type motor is that, in general, the commutation systems which substantially prevent short circuit currents in the armature windings enable low resistance brushes to be employed even as compared with those usually required in direct current machines. Another reason is the substantial elimination of reactance in the armature power circuit.

The circuit of this motor involves a resonator transformer which aids in maintaining the mutual flux in phase with the armature current and which at the same time may be designed to provide overload protection for the motor. This resonator transformer has utility in any alternating current or circuit where it is desired to counteract inductive reactance or provide overload protection or both. The circuit of the adjustable speed electric motor also involves a commutation circuit and system involving dual windings upon the armature, multiple brush element structures and a circuit for preventing flow of armature coil short circuit currents. The commutation system also has utility in various other motors and generators including direct current machines as well as in tap changing transformers or auto-transformers.

As stated above, all of the motors of the present invention will operate as generators, for example, they will all inherently produce regenerative braking in the same manner as direct current shunt motors. Where the machines of the present invention are employed primarily as generators, the power factor of the system is set by the load and the resonator transformer can not maintain the armature current in phase with the mutual flux under varying load conditions and, in general, will be omitted. Also in systems where the speed of the prime mover varies, for example in aircraft where the generator is driven by the propulsion engine, some means must be provided, such as an automatically controlled adjustable auto-transformer in the output circuit of the generator, to maintain the output voltage substantially constant. Such an isolated system also requires some means for setting the frequency of the system, for example, a small auxiliary power plant supplying excitation power at substantially constant frequency. The commutation system of the present invention, however, enables such asynchronous generators to be practically operated. Two or more generators can be operated in parallel at the same or different speeds and receive their excitation from the same frequency setting source.

While I have disclosed the preferred embodiments of my invention, it is understood that the details thereof may be varied within the scope of the following claims.

I claim:

1. In an adjustable speed alternating current motor system, a motor having a stator and a rotor, an excitation circuit for supplying excitation voltage and current to said motor from an alternating current power source to produce a mutual flux in said motor, means comprising a winding on said stator carrying current in the power axis of said motor substantially in phase opposition to rotor power current for confining said flux substantially to the excitation axis of said motor, armature windings on said rotor and a commutator carried by said rotor having commutator bars connected to said windings, brush elements contacting more than one of said bars in certain positions of said commutator, an armature circuit including said brush elements, said commutator and said windings for supplying power current from said source to said armature in the power axis of said motor, means in said armature circuit for substantially preventing flow of armature coil short circuit currents through said brush elements, means for producing capacitive reactance in said armature circuit to maintain said power current substantially in phase with the voltage applied across said armature circuit by said source, means for establishing a fixed phase relation between said last-named voltage and said excitation voltage to maintain said power current in phase with said mutual flux, and means for varying the amplitude of at least one of said voltages to adjust the speed of said motor.

2. In an adjustable speed alternating current motor system, a motor having a stator and a rotor, an excitation circuit for supplying excitation voltage and current to said motor from an alternating current power source to produce a mutual flux in said motor, means comprising a winding on said stator short circuited in the power axis of said motor for confining said flux substantially to the excitation axis of said motor, armature windings on said rotor and a commutator carried by said rotor having commutator bars connected to said windings, brush elements contacting more than one of said bars in certain positions of said commutator, an armature circuit including said brush elements, said commutator and said windings for supplying power current from said source to said armature in the power axis of said motor, means in said armature circuit for substantially preventing flow of armature coil short circuit currents through said brush elements, means for producing capacitive reactance in said armature circuit to maintain said power current substantially in phase with the voltage applied across said armature circuit by said source, means for establishing a fixed phase relation between said last-named voltage and said excitation voltage to maintain said power current in phase with said mutual flux, and means for varying the amplitude of at least one of said voltages to adjust the speed of said motor.

3. In an adjustable speed alternating current motor system, a motor having a stator and a rotor, an excitation circuit for supplying excitation voltage and current to said motor from an alternating current power source to produce a mutual flux in said motor, a low impedance bar winding on said stator providing closed loops positioned in planes parallel to the excitation axis of said motor for confining said flux substantially to the excitation axis of said motor, armature windings on said rotor and a commutator carried by said rotor having commutator bars connected to said windings, brush elements contacting more than one of said bars in certain positions of said commutator, an armature circuit including said brush elements, said commutator and said windings for supplying power current from said source to said armature in the power axis of said motor, means in said armature circuit for substantially preventing flow of armature coil short circuit currents through said brush elements, means for producing capacitive reactance in said armature circuit to maintain said power current substantially in phase with the voltage applied across said armature circuit by said source, means for establishing a fixed phase relation between said last-named voltage and said excitation voltage to maintain said power current in phase with said mutual flux, and means for varying the amplitude of at least one of said voltages to adjust the speed of said motor.

4. In an adjustable speed alternating current motor system, a motor having a stator and a rotor, an excitation circuit for supplying excitation voltages and current to said motor from an alternating current power source to produce a mutual flux in said motor, a low impedance bar winding on said stator comprising U bar elements having the legs of each element extending longitudinally of the motor and positioned in a plane perpendicular to the power axis of said motor, the free ends of said elements being connected together for confining said flux substantially to the excitation axis of said motor, armature windings on said rotor and a commutator carried by said rotor having commutator bars connected to said windings, brush elements contacting more than one of said bars in certain positions of said commutator, an armature circuit including said brush elements, said commutator and said windings for supplying power current from said source to said armature in the power axis of said motor, means in said armature circuit for substantially preventing flow of armature coil short circuit currents through said brush elements, means for producing capacitive reactance in said armature circuit to maintain said power current substantially in phase with the voltage applied across said armature circuit by said source, means for establishing a fixed phase relation between said last-named voltage and said excitation voltage to maintain said power current in phase with said mutual flux, and means for varying the amplitude of at least one of said voltages to adjust the speed of said motor.

5. In an adjustable speed alternating current motor system, a motor having a stator and a rotor, an excitation circuit for supplying excitation voltage and current to said motor from an alternating current power source to produce a mutual flux in said motor, means comprising a winding on said stator carrying current in the power axis of said motor substantially in phase opposition to rotor power current for confining said flux substantially to the excitation axis of said motor, two separate closed armature windings on said rotor, a commutator carried by said rotor having commutator bars alternately connected to said windings, brush structures each having at least six brush elements contacting said commutator bars and separate external connections to each brush element, said brush elements having a width and position relative to said commutator bars requiring that armature coil short circuit currents flow through said external connections, an armature circuit including said brush structures, said commutator and said windings for supplying power current from said source to said armature in the power axis of said motor, means in said armature circuit for substantially preventing flow of armature coil short circuit currents through said external connections while providing for varying distribution of said power current between said brush elements to maintain the power currents balanced in said armature windings, means for producing capacitive reactance in said armature circuit to maintain said power current substantially in phase with the voltage applied across said armature circuit by said source, means for establishing a fixed phase relation between said last-named voltage and said excitation voltage to maintain said power current in phase with said mutual flux, and means for varying the amplitude of at least one of said voltages to adjust the speed of said motor.

6. In an adjustable speed alternating current motor system, a motor having a stator and a rotor, an excitation circuit for supplying excitation voltage and current to said motor from an alternating current power source to produce a mutual flux in said motor, means comprising a winding on said stator carrying current in the power axis of said motor substantially in phase opposition to rotor power current for confining said flux substantially to the excitation axis of said motor, two separate closed armature windings on said rotor each having an odd number of armature coils therein, the coils of one winding being effectively spaced circumferentially of said rotor one-half coil pitch with respect to the coils of the other winding, a commutator carried by said rotor having commutator bars alternately connected to said windings, brush structures each having at least six brush elements contacting said commutator bars and separate external connections to each brush element, said brush elements having a width and position relative to said commutator bars and requiring that armature coil short circuit currents flow through said external connections, an armature circuit including said brush structures, said commutator and said windings for supplying power current from said source to said armature in the power axis of said motor, means in said armature circuit for substantially preventing flow of armature coil short circuit currents through said external connections while providing for varying distribution of said power current between said brush elements to maintain the power currents balanced in said armature windings, means for producing capacitive reactance in said armature circuit to maintain said power current substantially in phase with the voltage applied across said armature circuit by said source, means for establishing a fixed phase relation between said last-named voltage and said excitation voltage to maintain said power current in phase with said mutual flux, and means for varying the amplitude of at least one of said voltages to adjust the speed of said motor.

7. In an adjustable speed alternating current motor system, a motor having a stator and a rotor, an excitation circuit for supplying excitation voltage and current to said motor from an alternating current power source to produce a mutual flux in said motor, means comprising a winding on said stator carrying current in the power axis of said motor substantially in phase opposition to rotor power current for confining said flux substantially to the excitation axis of said motor, armature windings on said rotor and a commutator carried by said rotor having commutator bars connected to said windings, brush elements contacting more than one of said bars in certain positions of said commutator, an armature circuit including said brush elements, said commutator and said windings for supplying power current from said source to said armature in the power axis of said motor, means in said armature circuit for substantially preventing flow of armature coil short circuit currents through said brush elements, a resonator transformer having a primary winding in series in said armature circuit and a secondary winding connected across a capacitor for inserting capacitive reactance in said armature circuit to maintain said power current substantially in phase with the voltage applied across said armature circuit by said source, means for establishing a fixed phase relation between said last-named voltage and said excitation voltage to maintain said power current in phase with said mutual flux, and means for varying the amplitude of at least one of said voltages to adjust the speed of said motor.

8. In an adjustable speed alternating current motor system, a motor having a stator and a rotor, an excitation circuit for supplying excitation voltage and current to said motor from an alternating current power source to produce a mutual flux in said motor, means comprising a winding on said stator carrying current in the power axis of said motor substantially in phase opposition to rotor power current for confining said flux substantially to the excitation axis of said motor, armature windings on said rotor and a commutator carried by said rotor having commutator bars connected to said windings, brush elements contacting more than one of said bars in certain positions of said commutator, an armature circuit including said brush elements, said commutator and said windings for supplying power current from said source to said armature in the power axis of said motor, means in said armature circuit for substantially preventing flow of armature coil short circuit currents through said brush elements, a resonator transformer having a primary winding in series in said armature circuit and a secondary winding connected across a capacitor for inserting capacitive reactance in said armature circuit to maintain said power current substantially in phase with the voltage applied across said armature circuit by said source throughout the normal operating range of said motor, said resonator transformer being constructed to limit the power current in said armature circuit when said motor is overloaded, means for establishing a fixed phase relation between said last-named voltage and said excitation voltage to maintain said power current in phase with said mutual flux, and means for varying the amplitude of at least one of said voltages to adjust the speed of said motor.

9. In an alternating current motor system having a motor of the commutator type provided with a stator and an armature having armature coils thereon connected to said commutator, a circuit for exciting said motor from an alternating voltage source to produce an alternating mutual flux in said motor and an armature circuit for supplying armature power current from said source to said armature through said commutator, the combination with means for maintaining said power current in phase with said mutual flux including a winding on said stator carrying current in the power axis of said motor substantially in phase opposition to said armature power current for confining said mutual flux substantially entirely to the excitation axis of the motor, means for substantially preventing flow of armature coil short circuit currents in armature coils being commutated, means for maintaining the voltage applied across said armature circuit from said source in phase with said mutual flux, and means for introducing capacitive reactance into said armature circuit to maintain said armature current in phase with said voltage.

10. In an alternating current motor system having a motor of the commutator type provided with a stator and an armature having armature coils thereon connected to said commutator, a circuit for exciting said motor from an alternating voltage source to produce an alternating mutual flux in said motor and an armature circuit for supplying armature power current from said source to said armature through said commutator, the combination with means for maintaining said power current in phase with said mutual flux including a winding on said stator carrying current in the power axis of said motor substantially in phase opposition to said armature power current for confining said mutual flux substantially entirely to the excitation axis of the motor, means for substantially preventing flow of armature coil short circuit currents in armature coils being commutated, means for maintaining the voltage applied across said armature circuit from said source in phase with said mutual flux, and means for introducing capacitive reactance into said armature circuit to maintain said armature current in phase with said voltage, said last-mentioned means comprising a resonator transformer having a primary winding in series with said armature circuit and a secondary winding connected across a capacitor.

11. In an alternating current motor system having a motor of the commutator type provided with a stator and an armature having armature coils thereon connected to said commutator, a circuit for exciting said motor from an alternating voltage source to produce an alternating mutual flux in said motor and an armature circuit for supplying armature power current from said source to said armature through said commutator, the combination with means for maintaining said power current in phase with said mutual flux including a winding on said stator carrying current in the power axis of said motor substantially in phase opposition to said armature power current for confining said mutual flux substantially entirely to the excitation axis of the motor, means for substantially preventing flow of armature coil short circuit currents in armature coils being commutated, means for maintaining the voltage applied across said armature circuit from said source in phase with said mutual flux, and means for introducing capacitive reactance into said armature circuit to maintain said armature current in phase with said voltage, said last-mentioned means comprising a resonator transformer having a primary winding in series with said armature circuit and a secondary winding connected across a capacitor, said transformer having a core magnetic material, correlated with the number of turns in said primary winding to cause said core to saturate and the current in the primary winding to decrease when the voltage across said primary winding increases above a predetermined value in order to provide overload protection for said motor.

12. In an adjustable speed alternating current motor system, a motor having a stator and a rotor, an excitation circuit for supplying excitation voltage and current to said motor from an alternating current power source to produce a mutual flux in said motor, means comprising a winding on said stator carrying current in the power axis of said motor substantially in phase opposition to rotor power current for confining said flux substantially to the excitation axis of said motor, armature windings on said rotor and a commutator carried by said rotor having commutator bars connected to said windings, brush elements contacting more than one of said bars in certain positions of said commutator, an armature circuit including said brush elements, said commutator and said armature windings for supplying power current from said source to said armature in the power axis of said motor, means in said armature circuit for substantially preventing flow of armature coil short circuit currents through said brush elements, means for establishing a phase relationship between the exciting voltage applied to said motor and the voltage applied across said armature circuit which maintains said voltage applied across said armature circuit substantially in phase with said mutual flux, and means for varying the amplitude of at least one of said voltages to adjust the speed of said motor.

13. In an adjustable speed alternating current motor system, a motor having a stator and a rotor, an excitation circuit for supplying excitation voltage and current to said motor from an alternating current power source to produce a mutual flux in said motor, means comprising a winding on said stator short circuited in the power axis of said motor for confining said flux substantially to the excitation axis of said motor, armature windings on said rotor and a commutator carried by said rotor having commutator bars connected to said windings, brush elements contacting more than one of said bars in certain positions of said commutator, an armature circuit including said brush elements, said commutator and said armature windings for supplying power current from said source to said armature in the power axis of said motor, means in said armature circuit for substantially preventing flow of armature coil short circuit currents through said brush elements, means for establishing a phase relationship between the exciting voltage applied to said motor and the voltage applied across said armature circuit which maintains said voltage applied across said armature circuit substantially in phase with said mutual flux, and means for varying the amplitude of at least one of said voltages to adjust the speed of said motor.

14. In an adjustable speed alternating current motor system, a motor having a stator and a rotor, an excitation circuit for supplying excitation voltage and current to said motor from an alternating current power source to produce a mutual flux in said motor, a low impedance bar winding on said stator providing closed loops positioned in planes parallel to the excitation axis of said motor for confining said flux substantially to the excitation axis of said motor, armature windings on said rotor and a commutator carried by said rotor having commutator bars connected to said armature windings, brush elements contacting more than one of said bars in certain positions of said commutator, an armature circuit including said brush elements, said commutator and said armature windings for supplying power current from said source to said armature in the power axis of said motor, means in said armature circuit for substantially preventing flow of armature coil short circuit currents through said brush elements, means for establishing a phase relationship between the exciting voltage applied to said motor and the voltage applied across said armature circuit which maintains said voltage applied across said armature circuit substantially in phase with said mutual flux, and means for varying the amplitude of at least one of said voltages to adjust the speed of said motor.

15. In an adjustable speed alternating current motor system, a motor having a stator and a rotor, an excitation circuit for supplying excitation voltage and current to said motor from an alternating current power source to produce a mutual flux in said motor, means comprising a winding carrying current in the power axis of said motor substantially in phase opposition to rotor power current on said stator for confining said flux substantially to the excitation axis of said motor, two separate closed armature windings on said rotor each having armature coils therein, the coils of one armature winding being effectively spaced circumferentially of said rotor one-half coil pitch with respect to the coils of the other armature winding, a commutator carried by said rotor having commutator bars alternately connected to said armature windings, brush structures each having at least six brush elements contacting said commutator bars and separate external connections to each brush element, said brush elements having a width and position relative to said commutator bars requiring that armature coil short circuit currents flow through said external connections, an armature circuit including said brush structures, said commutator and said armature windings for supplying power current from said source to said armature in the power axis of said motor, means in said armature circuit for substantially preventing flow of armature coil short circuit currents through said external connections while providing for varying distribution of said power current between said brush elements to maintain the power currents balanced in said armature windings, means for establishing a phase relationship between the exciting voltage applied to said motor and the voltage applied across said armature circuit which maintains said voltage applied across said armature circuit substantially in phase with said mutual flux, and means for varying the amplitude of at least one of said voltages to adjust the speed of said motor.

16. In a non-synchronous dynamo-electric machine for alternating current operation, a stator, a rotor, a shunt excitation circuit for supplying alternating current excitation to said machine to produce an alternating mutual flux in said stator and rotor, means on said stator comprising a winding carrying current in the power axis of said machine substantially in phase opposition to rotor power current for confining said flux substantially to the excitation axis of said machine, armature windings on said rotor, a commutator carried by said rotor having commutator bars connected to said armature windings, brush elements contacting more than one of said bars in certain positions of said commutator, an armature circuit including said brush elements, said commutator and said armature windings, and means in said armature circuit for substantially preventing flow of short circuit currents through armature coils and between said brush elements.

17. In a non-synchronous dynamo-electric machine for alternating current operation, a stator, a rotor, a shunt excitation circuit for supplying alternating current excitation to said machine to produce an alternating mutual flux in said stator and rotor, means on said stator comprising a low impedance bar winding short circuited in the power axis of said machine for confining said flux substantially to the excitation axis of said machine, armature windings on said rotor, a commutator carried by said rotor having commutator bars connected to said armature windings, brush elements contacting more than one of said bars in certain positions of said commutator, an armature circuit including said brush elements, said commutator and said armature windings, and means in said armature circuit for substantially preventing flow of short circuit currents through armature coils and between said brush elements.

18. In a non-synchronous dynamo-electric machine for alternating current operation, a stator, a rotor, an excitation circuit for supplying alternating current excitation to said machine to produce an alternating mutual flux in said stator and rotor, means on said stator comprising a low impedance bar winding short circuited in the power axis of said machine for confining said flux substantially to the excitation axis of said machine, two separate closed armature windings on said rotor each having armature coils therein, the coils of one armature winding being effectively spaced circumferentially of said rotor one-half coil pitch with respect to the coils of the other armature winding, a commutator carried by said rotor having commutator bars alternately connected to said armature windings, brush structures each having at least six brush elements contacting said commutator bars and separate external connections to each brush element, said brush elements having a width and position relative to said commutator bars requiring that armature coil short circuit currents flow through said external connections, an armature circuit including said brush structures, said commutator and said armature windings, and means in said armature circuit for substantially preventing flow of armature coil short circuit currents through said external connections while providing for varying distribution of said power current between said brush elements to maintain the power currents substantially balanced in said armature windings.

19. An alternating current dynamo-electric machine comprising, a stator, a rotor provided with a commutator having commutator bars and with armature windings having armature coils connected to said bars, a shunt exciting circuit for providing an alternating flux in the excitation axis of said machine, brush structures each having a plurality of brush elements contacting said commutator bars for commutating said armature coils, an external armature circuit for said machine, said brush elements each having a separate connection to said external circuit, said brush elements, commutator bars and armature coils being arranged to require armature coil short circuit currents in armature coils being commutated to flow through said connections, said brush structures being positioned to commutate the armature coils in the power axis of the machine, means on said stator comprising a winding carrying current in the power axis of said machine substantially in phase opposition to armature power current for confining said flux substantially to the excitation axis of the machine so that substantially no speed voltages due to rotation of the armature in said flux are induced in the armature coils being commutated, and means for substantially preventing flow of armature coil short circuit currents through said connections as a result of transformer voltages induced by said alternating flux in the armature coils being commutated.

20. In a non-synchronous dynamo-electric machine for alternating current operation, a stator, a rotor, a shunt excitation circuit for supplying alternating current excitation to said machine to produce an alternating mutual flux in said stator and rotor, means on said stator comprising a winding carrying current in the power axis of said machine substantially in phase opposition to rotor power current for confining said flux substantially to the excitation axis of said machine, armature windings on said rotor, a commutator carried by said rotor having commutator bars connected to said armature windings, brush elements contacting more than one of said bars in certain positions of said commutator, an armature circuit including said brush elements, said commutator and said armature windings, means in said armature circuit for substantially preventing flow of short circuit currents through armature coils and between said brush elements, and means for producing capacitive reactance in said armature circuit to maintain said power current substantially in phase with the voltage across said armature circuit.

21. In a non-synchronous dynamo-electric machine for alternating current operation, a stator, a rotor, a shunt excitation circuit for supplying alternating current excitation to said machine to produce an alternating mutual flux in said stator and rotor, means on said stator comprising a winding carrying current in the power axis of said machine substantially in phase opposition to rotor power current for confining said flux substantially to the excitation axis of said machine, armature windings on said rotor, a commutator carried by said rotor having commutator bars connected to said armature windings, brush elements contacting more than one of said bars in certain positions of said commutator, an armature circuit including said brush elements, said commutator and said armature windings, means in said armature circuit for substantially preventing flow of short circuit currents through armature coils and between said brush elements, and a resonator transformer having a primary winding in series in said armature circuit, and a secondary winding connected across a capacitor for inserting capacitive reactance in said armature circuit to maintain said power current substantially in phase with voltage across said armature circuit.

22. In a non-synchronous dynamo-electric machine for alternating current operation, a stator, a rotor, a shunt excitation circuit for supplying alternating current excitation to said machine to produce an alternating mutual flux in said stator and rotor, means on said stator comprising a low impedance bar winding short circuited in the power axis of said machine for confining said flux substantially to the excitation axis of said machine, armature windings on said rotor, a commutator carried by said rotor having commutator bars connected to said armature windings, brush elements contacting more than one of said bars in certain positions of said commutator, an armature circuit including said brush elements, said commutator and said armature windings, means in said armature circuit for substantially preventing flow of short circuit currents through armature coils and between said brush elements, and means for producing capacitive reactance in said armature circuit to maintain said power current substantially in phase with voltage across said armature circuit.

23. In a non-synchronous dynamo-electric machine for alternating current operation, a stator, a rotor, a shunt excitation circuit for supplying alternating current excitation to said machine to produce an alternating mutual flux in said stator and rotor, means on said stator comprising a low impedance bar winding short circuited in the power axis of said machine for confining said flux substantially to the excitation axis of said machine, armature windings on said rotor, a commutator carried by said rotor having commutator bars connected to said armature windings, brush elements contacting more than one of said bars in certain positions of said commutator, an armature circuit including said brush elements, said commutator and said armature windings, means in said armature circuit for substantially preventing flow of short circuit currents through armature coils and between said brush elements, and a resonator transformer having primary winding in series in said armature circuit, and a secondary winding connected across a capacitor for inserting a capacitive reactance in said armature circuit to maintain said power current substantially in phase with voltage across said armature circuit.

LELAND CLAY WEATHERS.

REFERENCES CITED

The following references are of record in the file of this patent:

UNITED STATES PATENTS

| Number | Name | Date |
|---|---|---|
| 837,889 | Seyfert | Dec. 4, 1906 |
| 877,017 | Torda | Jan. 21, 1908 |
| 1,005,858 | Lord | Oct. 17, 1911 |
| 1,059,134 | Forander | Apr. 15, 1913 |
| 1,304,294 | Fortesque | May 20, 1919 |
| 1,359,855 | Korthals-Altes | Nov. 23, 1920 |
| 2,116,435 | Kramer | May 3, 1938 |
| 2,117,900 | Mirow | May 17, 1938 |
| 2,192,050 | Norcross | Feb. 27, 1940 |
| 2,202,715 | Partington | May 28, 1940 |
| 2,254,903 | Mirow | Sept. 2, 1941 |
| 2,278,622 | Norcross | Apr. 7, 1942 |
| 2,288,415 | Ogden | June 30, 1942 |

FOREIGN PATENTS

| Number | Country | Date |
|---|---|---|
| 196,290 | Great Britain | June 21, 1924 |